US012083552B2

(12) United States Patent
Qiu

(10) Patent No.: US 12,083,552 B2
(45) Date of Patent: Sep. 10, 2024

(54) ADHESIVE DISPENSER WITH SLOTTED NOZZLE ASSEMBLY

(71) Applicant: NORDSON CORPORATION, Westlake, OH (US)

(72) Inventor: Zhongquan Qiu, Minhang District (CN)

(73) Assignee: Nordson Corporation, Westlake, OH (US)

(*) Notice: Subject to any disclaimer, the term of this patent is extended or adjusted under 35 U.S.C. 154(b) by 600 days.

(21) Appl. No.: 17/295,079

(22) PCT Filed: Nov. 21, 2019

(86) PCT No.: PCT/US2019/062546
§ 371 (c)(1),
(2) Date: May 19, 2021

(87) PCT Pub. No.: WO2020/106923
PCT Pub. Date: May 28, 2020

(65) Prior Publication Data

US 2022/0008951 A1 Jan. 13, 2022

Related U.S. Application Data

(60) Provisional application No. 62/770,205, filed on Nov. 21, 2018.

(51) Int. Cl.
*B05C 5/02* (2006.01)
*B05C 11/10* (2006.01)

(52) U.S. Cl.
CPC .......... *B05C 5/0258* (2013.01); *B05C 5/0275* (2013.01); *B05C 11/1034* (2013.01)

(58) Field of Classification Search
None
See application file for complete search history.

(56) References Cited

U.S. PATENT DOCUMENTS 6,517,178 B1 2/2003 Yamamoto et al.
9,724,716 B2 * 8/2017 Khoury .................... B05D 1/02
(Continued)

FOREIGN PATENT DOCUMENTS

CN 107471829 A 12/2017
WO 2018/208876 A1 11/2018

OTHER PUBLICATIONS

ISA/220—Notification of Transmittal of Search Report and Written Opinion of the ISA, or the Declaration Mailed on Mar. 13, 2020 for WO Application No. PCT/US19/062546.

*Primary Examiner* — Jethro M. Pence
(74) *Attorney, Agent, or Firm* — BakerHostetler

(57) ABSTRACT

An adhesive dispenser having a pump and a slotted nozzle assembly is disclosed. The pump includes a pump body assembly having a nozzle body defining a recess that extends into the body, and a fluid channel with an inlet to receive adhesive and an outlet open to the recess. The pump includes a valve member movably disposed in the fluid channel and configured to selectively block the adhesive from flowing to the outlet. The slotted nozzle assembly includes a baffle plate having a slot that extends through the plate and a cover plate attached to the plate. The slotted nozzle assembly is received in the recess of the nozzle body, such that an input channel extending from the outlet of the body to the slot is defined between the baffle plate and the nozzle body, and an output channel extending from the slot to a dispensing outlet is defined between the baffle plate and the cover plate.

26 Claims, 26 Drawing Sheets

(56) References Cited

U.S. PATENT DOCUMENTS

| | | | | |
|---|---|---|---|---|
| 10,150,131 | B2 * | 12/2018 | Giusti | B05D 1/02 |
| 10,279,364 | B2 * | 5/2019 | Khoury | B05B 13/0228 |
| 10,821,466 | B2 * | 11/2020 | Orla-Jensen | H01L 21/6715 |
| 11,433,418 | B2 * | 9/2022 | Gould | F24H 1/10 |
| 11,577,270 | B2 * | 2/2023 | Orla-Jensen | B05D 3/0272 |
| 11,583,887 | B2 * | 2/2023 | Burmester | B05C 5/0254 |
| 2009/0188604 | A1 | 7/2009 | Ganzer et al. | |
| 2012/0219657 | A1 | 8/2012 | Kondo | |
| 2014/0000511 | A1 | 1/2014 | Wang et al. | |
| 2018/0117619 | A1 | 5/2018 | Choi et al. | |
| 2020/0197958 | A1 * | 6/2020 | Qiu | B05B 1/302 |

* cited by examiner

ADHESIVE DISPENSER WITH SLOTTED NOZZLE ASSEMBLY

CROSS REFERENCE TO RELATED APPLICATIONS

This application is a National Stage Application of International Patent App. No. PCT/US2019/062546, filed Nov. 21, 2019, which claims the benefit of U.S. Provisional Patent App. No. 62/770,205, filed Nov. 21, 2018, the entire disclosures of both of which are hereby incorporated by reference as if set forth in their entirety herein.

TECHNICAL FIELD

This disclosure generally relates to adhesive dispensers for applying an adhesive to a substrate and, more particularly to a pump and slotted nozzle assembly of an adhesive dispenser for applying a pattern of adhesive to a substrate.

BACKGROUND

In the garment manufacturing field, adhesive dispensers are commonly used to apply an adhesive, such as a polyurethane (PUR) glue, to a fabric or cloth for binding pieces of the fabric or cloth together. When bonding pieces of fabric together, an adhesive dispenser is required that has the ability to apply a small amount of a material with a high degree of accuracy and precision. For example, the width of the desired strip of material to be applied to a fabric can have requirements of less than 8 mm in width and less than 0.2 mm in height. In many currently existing adhesive dispensers, adhesive is sprayed with low levels of accuracy and precision, which can result in the spraying of excessive amounts of adhesive.

In addition to problems caused by excessive adhesive spray, in many conventional adhesive dispensers, material will continue to flow out of the adhesive dispenser for some time after the spraying operation has completed due to the effects of gravity. Due to the fact that during a conventional fabric bonding process an operator needs to repeatedly start and stop the adhesive dispenser, adhesive will constantly flow out of the adhesive dispenser, leading to big ends, silk drawing, and other defects. Additionally, many conventional adhesive dispensers have weights and sizes that prevent their implementation in an environment requiring compact and low-weight design, such as on a tabletop.

Therefore, there is a need for an adhesive dispenser that is compact, low-weight, and accurately applies adhesive and minimizes continued flowing of adhesive out of the adhesive dispenser during a nonoperational state due to gravity.

SUMMARY

An embodiment of the present disclosure is an adhesive dispenser that includes a pump. The pump comprises a pump body assembly including a nozzle body defining a recess that extends into the nozzle body, and a fluid channel that has an inlet configured to receive adhesive and an outlet, where the outlet is open to the recess. The pump also comprises a valve member movably disposed in the fluid channel and configured to selectively block the adhesive from flowing to the outlet of the fluid channel. The adhesive dispenser also includes a slotted nozzle assembly for dispensing the adhesive, where the slotted nozzle assembly comprises a baffle plate including a slot that extends through the baffle plate and a cover plate attached to the baffle plate. The slotted nozzle assembly is received in the recess of the nozzle body such that an input channel that extends from the outlet of the nozzle body to the slot is defined between the baffle plate and the nozzle body, and an output channel that extends from the slot to a dispensing outlet is defined between the baffle plate and the cover plate.

DETAILED DESCRIPTION OF ILLUSTRATIVE EMBODIMENTS

Figure 1:
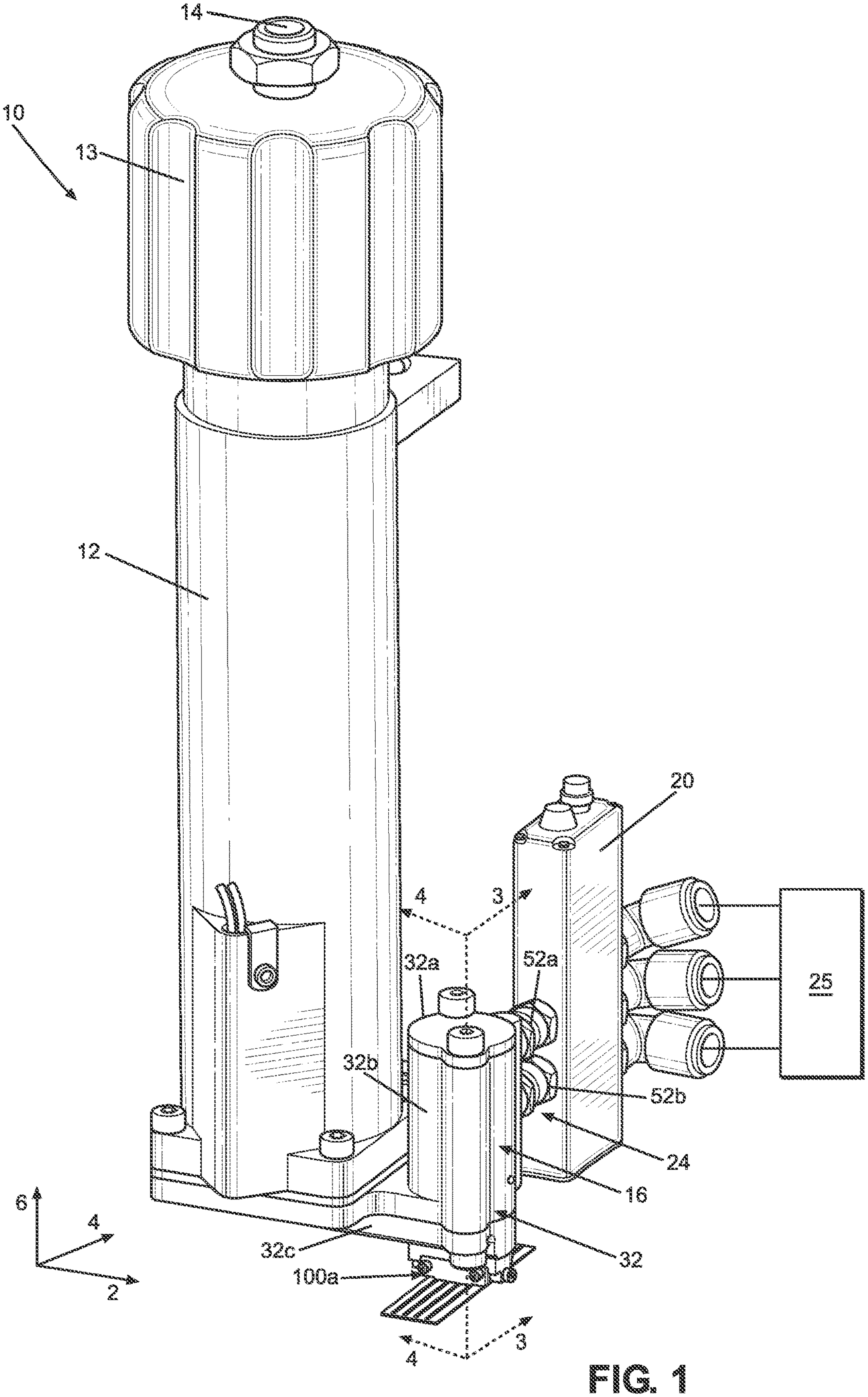
FIG. 1 is a perspective view of an adhesive dispenser according to an embodiment of the present disclosure.
Figure 2:
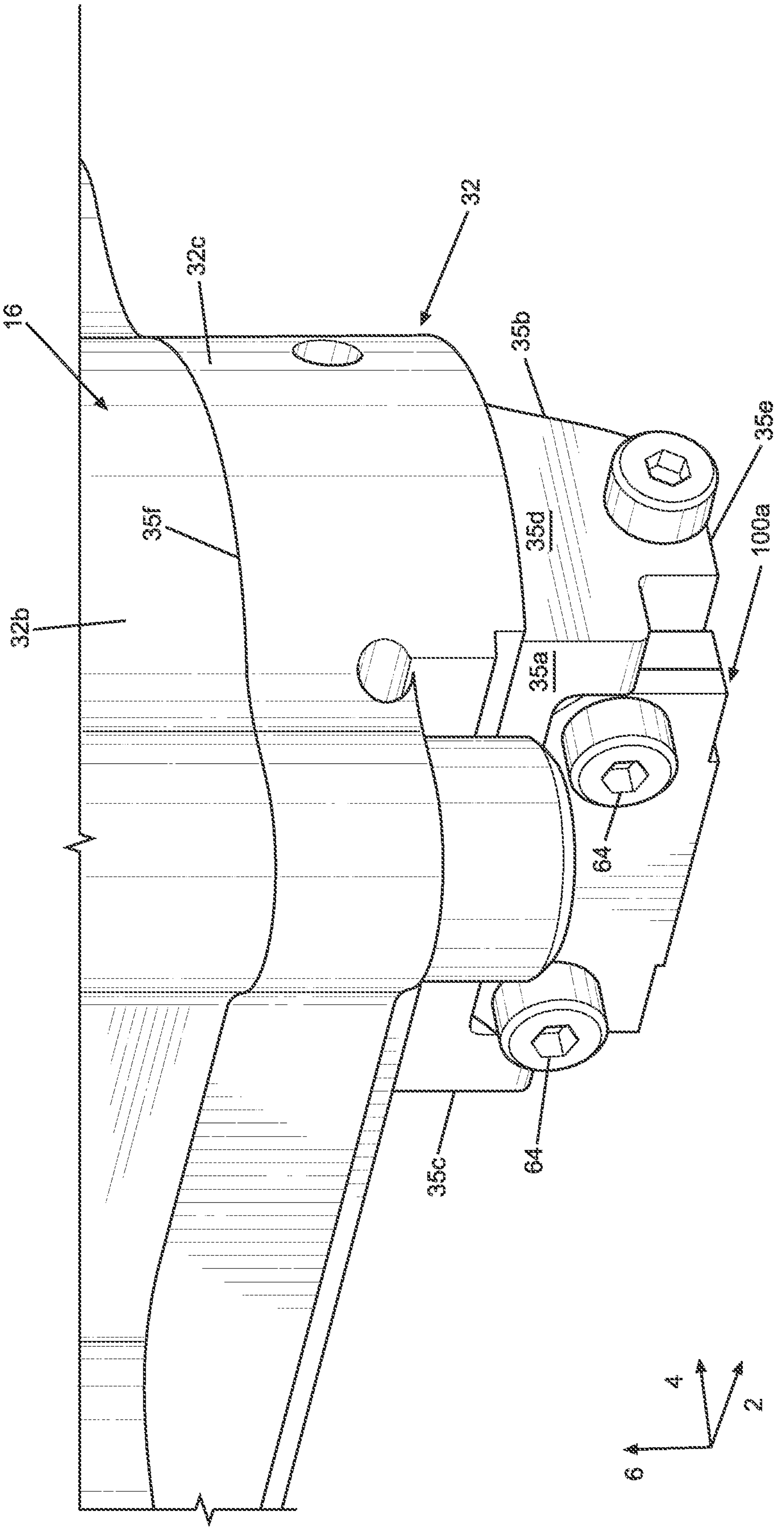
FIG. 2 is a perspective view of a lower portion of the adhesive dispenser shown in FIG. 1.
Figure 3:
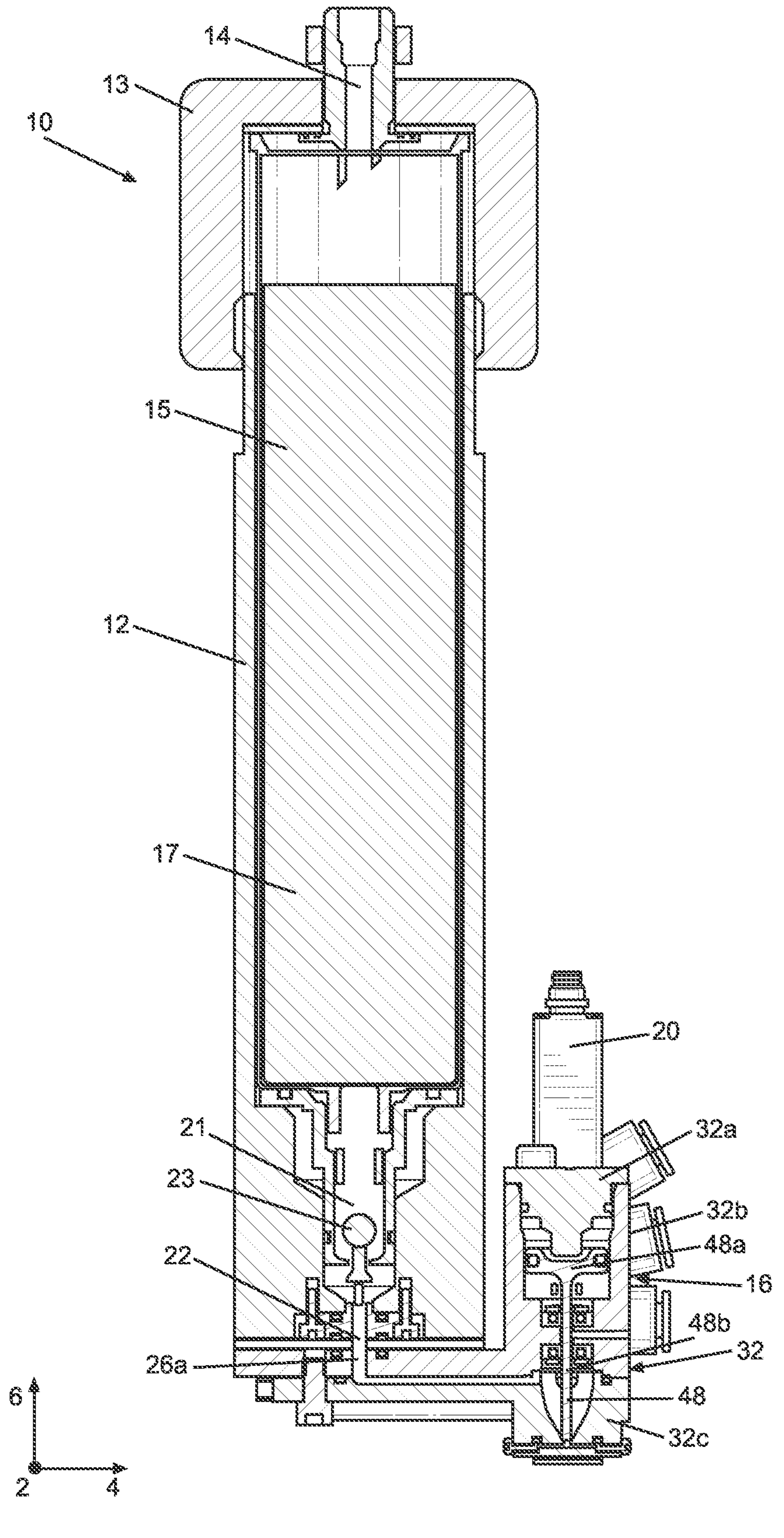
FIG. 3 is a cross-sectional view of the adhesive dispenser shown in FIG. 1, taken along line 3-3 shown in FIG. 1.
Figure 4:
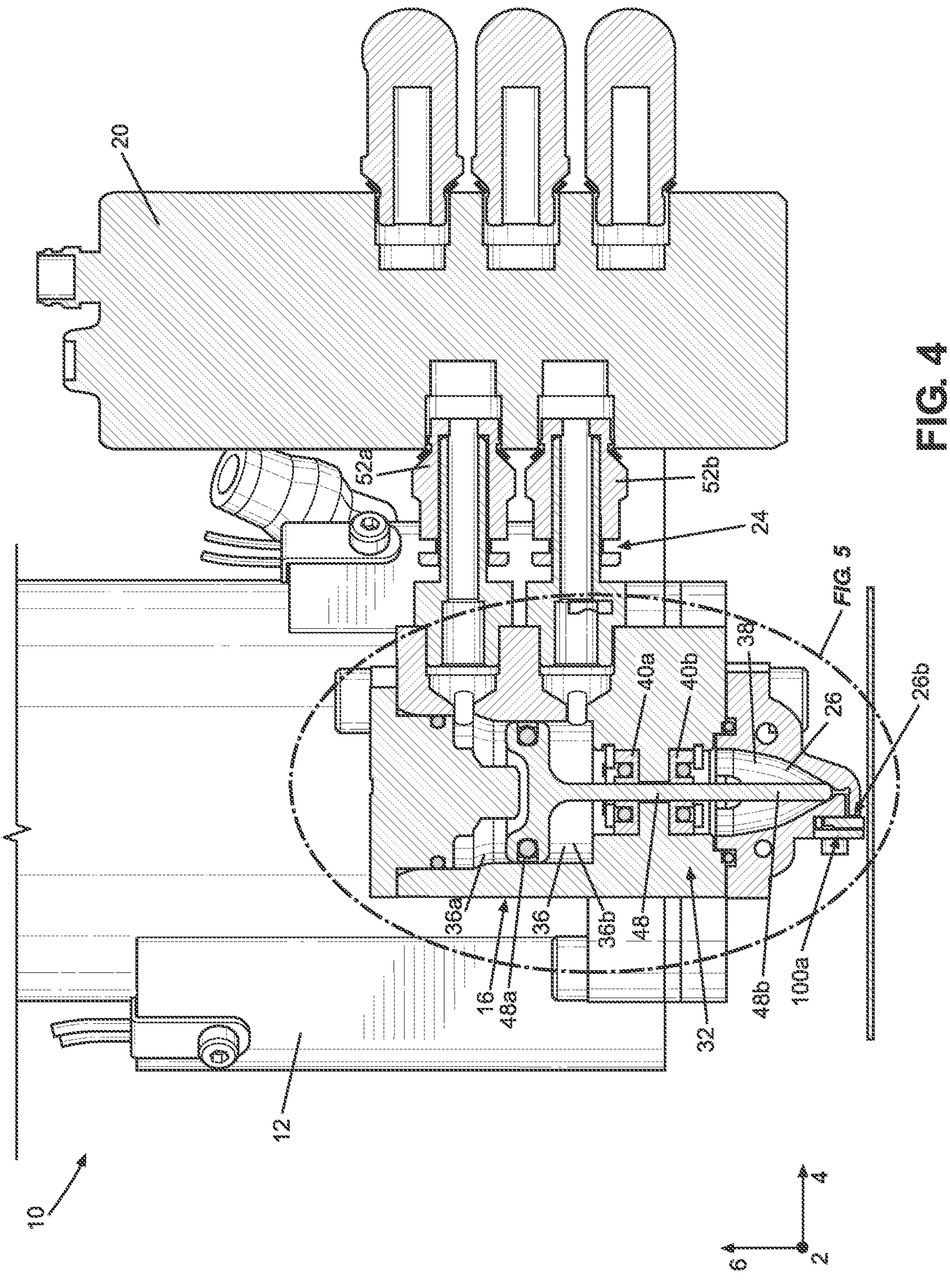
FIG. 4 is a cross-sectional view of the adhesive dispenser shown in FIG. 1, taken along line 4-4 shown in FIG. 1.
Figure 5:
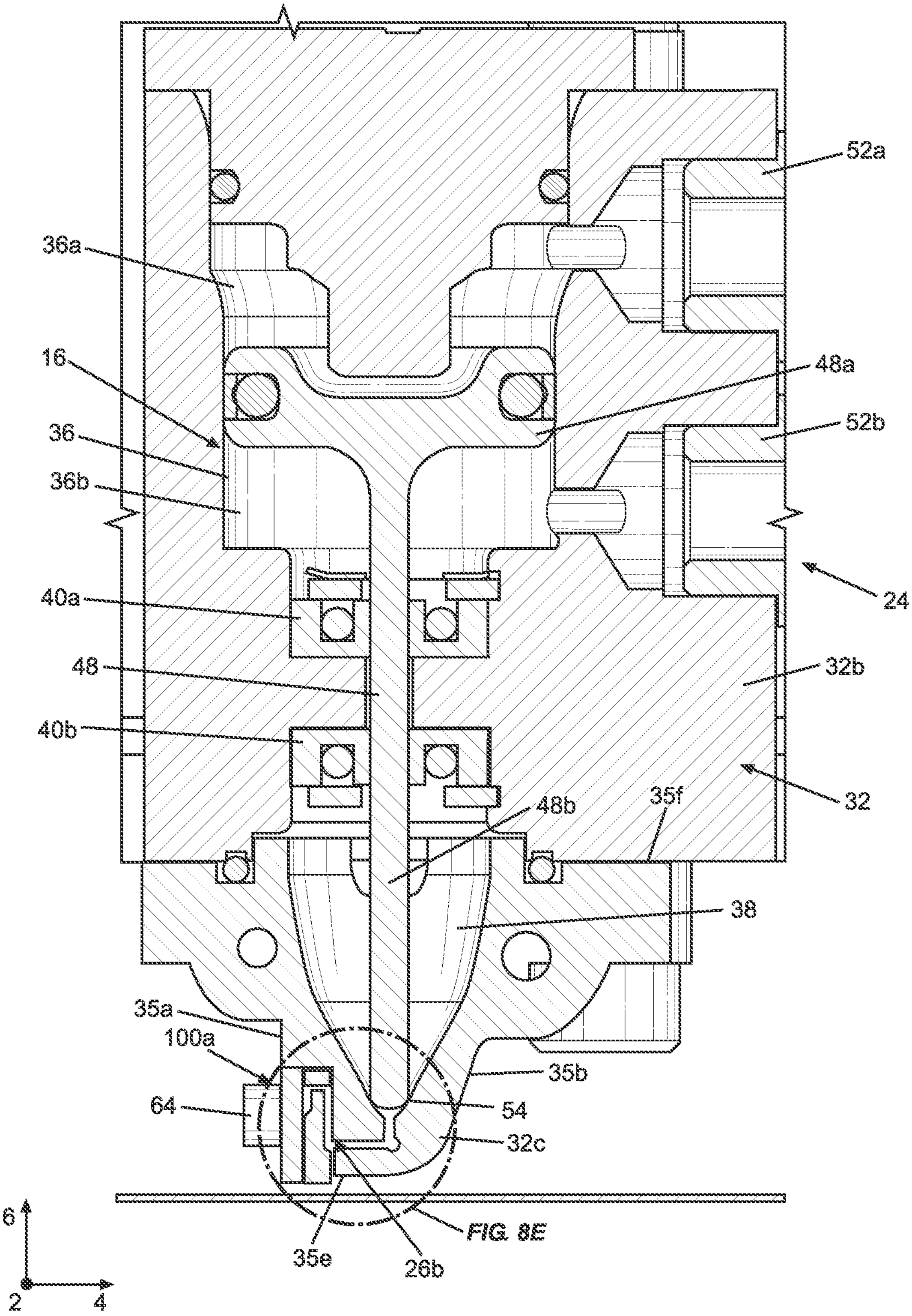
FIG. 5 is an enlarged cross-sectional view of the adhesive dispenser shown in FIG. 1, as noted by the encircled region in FIG. 4.
Figure 6:
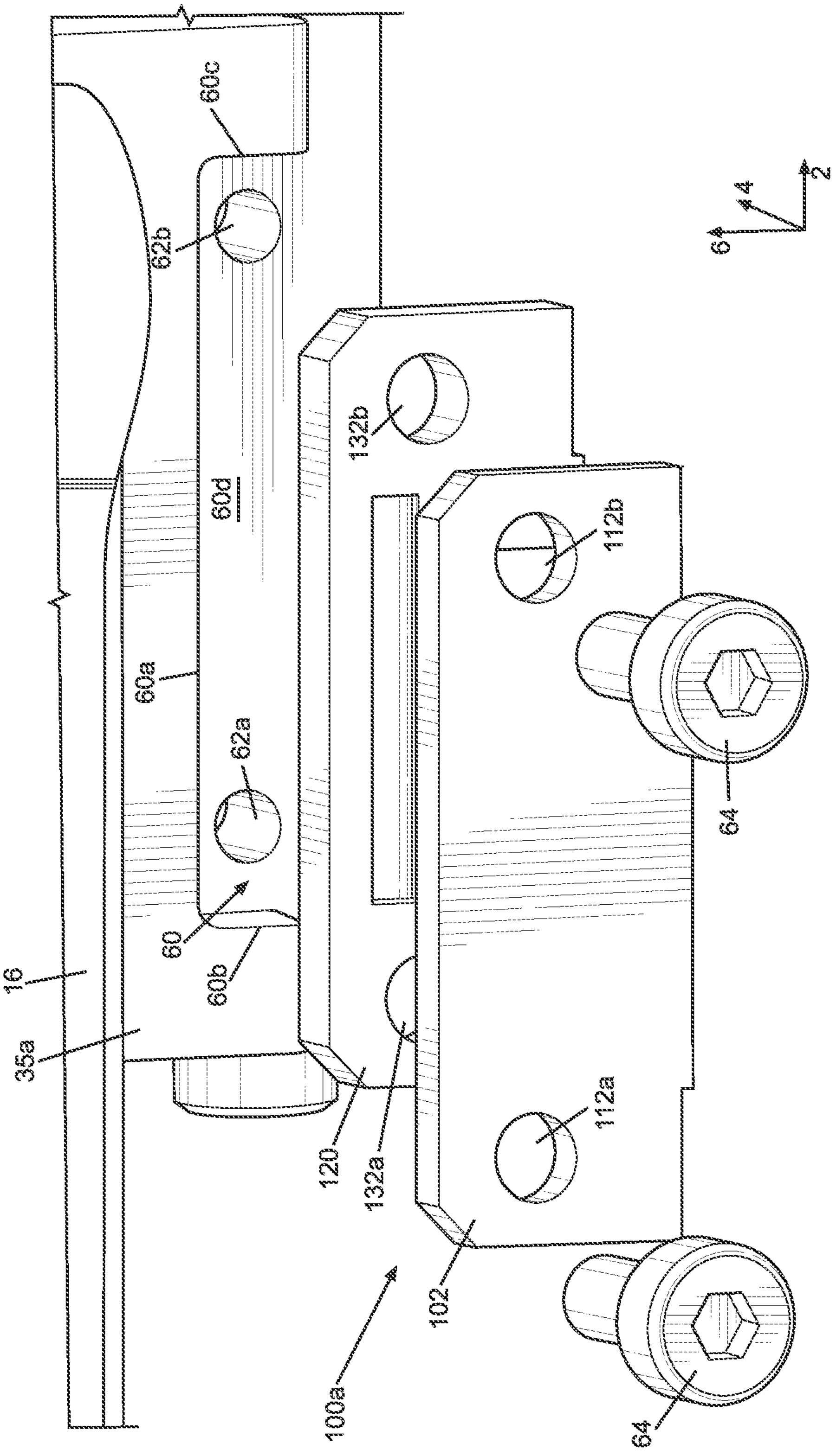
FIG. 6 is an exploded view of a nozzle body and a slotted nozzle assembly according to an embodiment of the present disclosure.
Figure 7:
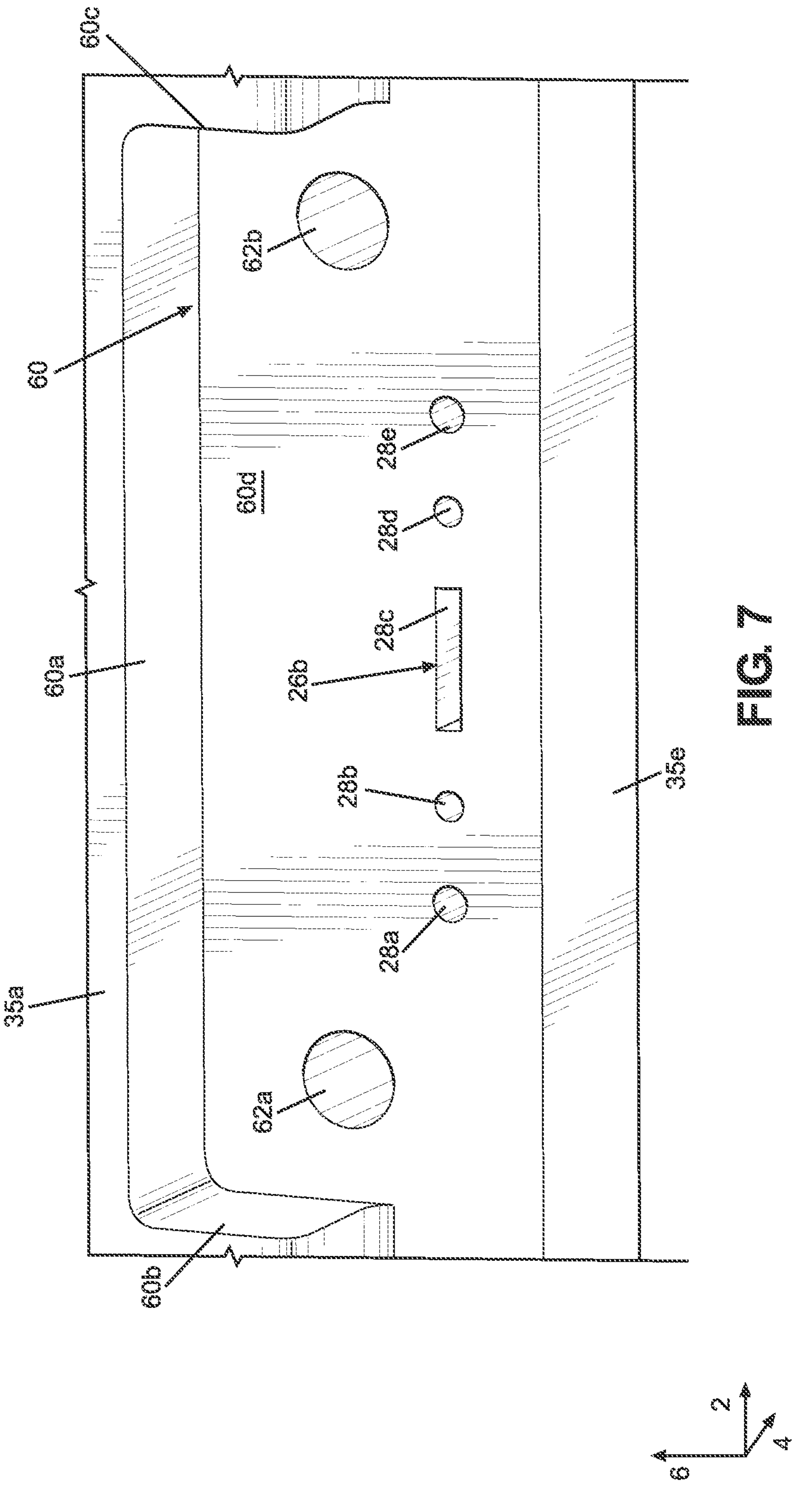
FIG. 7 is a perspective view of the a nozzle body of the adhesive dispenser shown in FIG. 1.

Described herein is an adhesive dispenser 10 that includes a material supply 12, a pump 16, and a slotted nozzle assembly 100*a*-100*d* for applying an adhesive to a substrate 80. Certain terminology is used to describe the adhesive dispenser 10 in the following description for convenience only and is not limiting. The words “right”, “left”, “lower,” and “upper” designate directions in the drawings to which reference is made. The words “inner” and “outer” refer to directions toward and away from, respectively, the geometric center of the description to describe the adhesive dispenser 10 and related parts thereof. The words “forward” and “rearward” refer to directions in a longitudinal direction 2 and a direction opposite the longitudinal direction 2 along the adhesive dispenser 10 and related parts thereof. The terminology includes the above-listed words, derivatives thereof and words of similar import.

Unless otherwise specified herein, the terms “longitudinal,” “lateral,” and “vertical” are used to describe the orthogonal directional components of various components of the adhesive dispenser 10, as designated by the longitudinal direction 2, lateral direction 4, and vertical direction 6. It should be appreciated that while the longitudinal and lateral directions 2, 4 are illustrated as extending along a horizontal plane, and the vertical direction 6 is illustrated as extending along a vertical plane, the planes that encompass the various directions may differ during use.

Referring to FIGS. 1-8, the adhesive dispenser 10 includes a material supply 12 for storing a supply of the adhesive. In the depicted embodiment, the material supply 12 defines a cavity 15 for receiving a prepackaged syringe 17 that contains a supply of the adhesive. However, other embodiments for supplying the material supply 12 with adhesive are contemplated, such as directly filling the material supply 12 with a volume of the adhesive or pumping adhesive to the material supply 12 from an external supply (not shown) that is spaced from the adhesive dispenser 10. In some embodiments, the adhesive may be a glue, such as polyurethane (PUR) glue, though other materials are contemplated. The material supply 12 can be configured to melt and/or maintain the adhesive at an elevated temperature while it remains within the material supply 12. In some embodiments, the material supply 12 can be designed to hold up to 300 milliliters (ml) of adhesive, though the material supply 12 can be larger or smaller as desired. For example, the material supply 12 can also be designed to hold 30 ml of adhesive. The material supply 12 can include a heating element (not shown) to provide heat to the adhesive within the material supply 12, or, alternatively, to maintain a desired temperature within the material supply 12. This prevents the adhesive from cooling when it is being dispensed, thus preserving the desired flow properties. In some embodiments, the adhesive dispenser 10 may include a second heating element (not shown) that is configured to maintain the adhesive at a different temperature than the heating element described above. Further, the material supply 12 can include a cap 13 for securing the syringe 17 within the cavity 15, where the cap 13 defines a passage 14 extending therethrough. The passage 14 can be connected to an external pressurized air source (not shown) that is configured to apply pressure to the adhesive within the cavity 15 for pumping the adhesive out of the material supply 12.

The material supply 12 further includes a fluid channel 21 that extends from the cavity 15 to a fluid outlet 22. The fluid outlet 22 is configured to provide the adhesive to the inlet 26*a* of the pump 16, as will be described below. A check valve 23 can be disposed in the fluid channel 21 between the cavity 15 and the fluid outlet 22 to prevent adhesive that has flowed past the check valve 23 from returning to the cavity 15. This prevents the contamination of new adhesive disposed in the cavity 15 after an old supply of adhesive has been replaced. Though a ball-type check valve 23 is shown, other conventional types of check valves can alternatively be incorporated.

The adhesive dispenser 10 also includes a pump 16 releasably attached to the material supply 12 and fluidly connected to the material supply 12. The pump 16 can include a pump body assembly 32 comprising a pump body 32*b*, a cap 32*a* attached to the upper end of the pump body 32*b*, and a nozzle body 32*c* attached to the lower end of the pump body 32*b*. It will be understood that the pump 16 can alternatively define a monolithic body or have any other number of components. The pump body 32*b* can define the portion of the pump body assembly 32 that directly connects to the material supply 12, though other arrangements are contemplated.

The pump body assembly 32 can define several hollow portions. For example, the pump body 32*b* and the nozzle body 32*c* of the pump body assembly 32 can collectively define a fluid channel 26 that extends from an inlet 26*a* to an outlet 26*b*. The fluid channel 26 is configured to receive adhesive from the material supply 12 through the inlet 26*a* and provide the adhesive to one of the nozzle assemblies 100*a*-100*d* through the outlet 26*b*, as will be described further below. Additionally, the pump body 32*b* and the nozzle body 32*c* can collectively define an upper chamber 36 and a lower chamber 38. Upper and lower seal packs 40*a*, 40*b* are positioned within the pump body assembly 32 to separate the upper and lower chambers 36, 38.

The pump 16 also includes a valve member 48 positioned within the pump body assembly 32. The valve member 48 defines an upper end 48*a* and a valve stem 48*b* that extends from the upper end 48*a* along the vertical direction 6. The upper end 48*a* is positioned within the upper chamber 36, while the valve stem 48*b* extends from the upper end 48*a* through the upper chamber 36, through the upper and lower seal packs 40*a*, 40*b*, and into the lower chamber 38, which can define a portion of the fluid channel 26. The valve member 48 is configured to be movably disposed within the upper and lower chambers 36, 38, and thus the fluid channel 26. The upper and lower seal packs 40*a*, 40*b* are configured to prevent adhesive migration from the lower chamber 38 to the upper chamber 36 and pressurized air migration from the upper chamber 36 to the lower chamber 38. A valve seat 54 is disposed at the lower end of the lower chamber 38 and is defined by the nozzle body 32*c*. In operation, the valve member 48 is configured to reciprocate within the pump body assembly 32 between a first, retracted position and a second, extended position. In the retracted position, the valve stem 48*b* is spaced in an entirety from the valve seat 54, allowing adhesive to flow past the valve stem 48*b* and the valve seat 54 and to the outlet 26*b* of the fluid channel 26. In the extended position, the valve stem 48*b* contacts the valve seat 54 and the adhesive is blocked from flowing to the outlet 26*c* of the fluid channel 26. As such, the valve member 48 is configured to selectively block the flow of adhesive through the fluid channel 26.

The translation of the valve member 48 can be caused by pressurized air that flows into the upper chamber 36 through first and second air paths 52*a*, 52*b* of connector 24. Each of first and second air paths 52*a*, 52*b* can receive pressurized air from a valve 20, which is connected to the pump 16 through the connector 24. The valve 20 can be a pneumatic valve, an electronic valve, or any other type of valve as desired. The valve 20 can be connected to and receive the pressurized air from a pressurized air source 25, such that the valve functions to control the flow of air from the pressurized air source 25 to the pump 16. The upper end 48*a* of the valve member 48 divides the upper chamber 36 into first and second portions 36*a*, 36*b*, where the first portion 36*a* can receive pressurized air from the first air path 52*a*, and the second portion 36*b* can receive pressurized air from the second air path 52*b*. Specifically, the first portion 36*a* can be defined between the cap 32*a* and the upper end 48*a* of the valve member 48, and the second portion 36*b* can be defined between the upper end 48*a* of the valve member 48 and the pump body 32*b*. When pressurized air flows through the first air path 52*a* and into the first portion 36*a* of the upper chamber 36, the valve member 48 is driven downwards along the vertical direction 6 into the extended position. In contrast, when pressurized air flows through the second air path 52*b* and into the second portion 36*b* of the upper chamber 36, the valve member 48 is driven upwards along the vertical direction 6 into the retracted position.

When the valve member 48 transitions from the retracted position to the extended position along the vertical direction 6, the valve member 48 travels a distance that can be referred to as the stroke length. The required stroke length can vary between dispensing operations, types of materials dispensed, wear of internal parts over time, etc. In one embodiment of the pump 16, the stroke length can be adjusted using a limiting rod (not shown) that extends through the cap 32*a* of the pump body assembly 32 and into the first portion 36*a* of the upper chamber 36. When the valve member 48 is in the retracted position, the upper end 48*a* can contact the lower end of the limiting rod, such that the limiting rod 44 controls the how far upwards the valve member 48 moves in the retracted position. The limiting rod can threadedly engage the cap 32*a*, such that rotation of the limiting rod relative to the cap 32*a* moves the limiting rod further into or out of the upper chamber 36, thus changing the maximum upward position of the valve member 48 in the retracted position, and likewise the stroke length. However, other methods for adjusting the stroke length are also contemplated.

Continuing with FIGS. 2 and 5-7, the nozzle body 32*c* of the pump body assembly 32 can define an outer surface that comprises a front surface 35*a*, a rear surface 35*b* opposite the front surface 35*a* along the lateral direction 4, a first side surface 35*c*, a second side surface 35*d* opposite the first side surface 35*c* along the longitudinal direction 2, a lower surface 35*e*, and a top surface 35*f* opposite the lower surface 35*e* along the vertical direction 6. In particular, the top surface 35*f* can directly contact the pump body 32*b* when the pump body assembly 32 is completely assembled, while the nozzle body 32*c* can define a recess 60 that extends into the nozzle body 32*c* from the front and lower surfaces 35*a*, 35*e*. The nozzle body 32*c* can have a plurality of surfaces that define the recess 60. In particular, the nozzle body 32*c* can have an upper recess surface 60*a*, a first side recess surface 60*b*, a second side recess surface 60*c* opposite the first side recess surface 60*b* along the longitudinal direction 2, and a rear recess surface 60*d*. Each of the surfaces 60*a*-60*d* can collectively define the recess 60, which is configured to receive a slotted nozzle assembly 100*a*-100*d*, as will be described further below.

Figure 14:
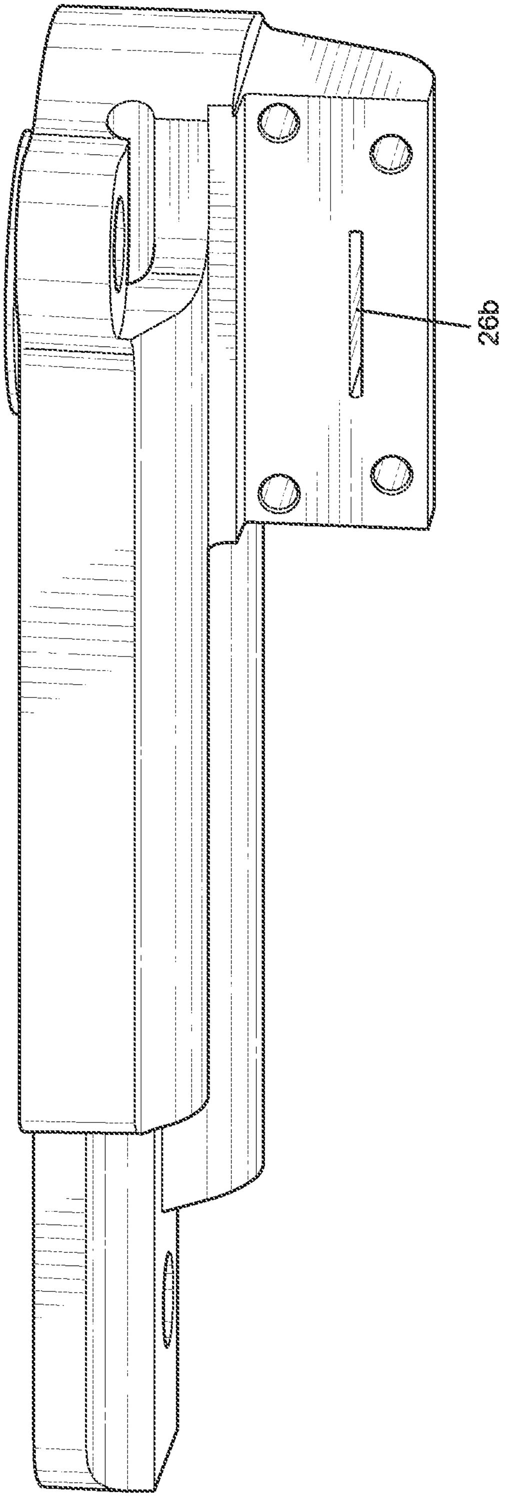
FIG. 14 is an isometric perspective view of a nozzle body according to another aspect of the present disclosure.

In the depicted embodiment, the recess 60 is substantially rectangular, though other shapes are contemplated depending on the shape of the slotted nozzle assembly to be attached. The upper recess surface 60*a* can extend from the front surface 35*a* of the nozzle body 32*c* to the rear recess surface 60*d*, while the rear recess surface 60*d* can extend from the lower surface 35*e* of the nozzle body 32*c* to the upper recess surface 60*a*. The outlet 26*b* of the fluid channel 26 can be defined by the rear recess surface 60*d*, causing the outlet 26*b* to be open to the recess 60. In particular, the outlet 26*b* can comprise a plurality of outlets 28*a*-28*e*. Though five outlets 28*a*-28*e* are shown specifically, the outlet 26*b* can include more or less than six outlets, such as one, two, three, or more than six outlets. Further, each of the outlets 28*a*-28*e* can be differently configured. In the depicted embodiment, the third outlet 28*c* is depicted as a lateral slot, while the first, second, fourth, and fifth outlets 28*a*, 28*b*, 28*d*, 28*e* are depicted as circular holes. However, the outlets 28*a*-28*e* can be alternatively configured to include other combinations of the depicted shapes or other shapes not shown. Additionally, the outlets 28*a*-28*e* are shown as substantially aligned along the longitudinal direction 2. Despite this, in other embodiments the outlets 28*a*-28*e* can be alternatively spaced. The rear recess surface 60*d* can also define two bores 62*a*, 62*b* configured to receive respective fasteners 64 for releasably attaching one of the slotted nozzle assemblies 100*a*-100*d* to the pump 16. The slotted nozzle assemblies 100*a*-100*d* are each configured to dispense the adhesive onto the substrate in a particular pattern. Each of the slotted nozzle assemblies 100*a*-100*d* will be discussed below in turn. Referring to the exemplary aspect depicted in FIG. 14, for example, the outlet 26*b* may be a single rectangular slot.

Referring to FIGS. 8A-8E, a first embodiment of a slotted nozzle assembly 100*a* and its constituent components are depicted. The slotted nozzle assembly 100*a* can comprise a cover plate 102 and a baffle plate 120. The cover plate 102 can be a substantially rectangular shaped plastic or metallic component. The cover plate 102 can define a body 104 that has a front surface 104*a*, a rear surface 104*b* opposite the front surface 104*a* along the lateral direction 4, an upper surface 104*c*, a lower surface 104*d* opposite the upper surface 104*c* along the vertical direction 6, a first side surface 104*e*, and a second side surface 104*f* opposite the first side surface 104*e* along the longitudinal direction 2. The cover plate 102 can also include a lip 108 embodying a substantially rectangular protrusion that extends from the lower surface 104*d* along the vertical direction 6 and along the lower surface 104*d* in the longitudinal direction 2. Additionally, the cover plate 102 can define bores 112*a*, 112*b* that extend from the front surface 104*a* to the rear surface 104*b* along the lateral direction 4. Each of the bores 112*a*, 112*b* is configured to receive a respective fastener 64. Though the cover plate 102 is shown as including two bores 112*a*, 112*b*, the cover plate 102 can include more or less bores as desired. However, the number of bores included in the cover plate 102 will generally correspond to the number of bores defined by the rear recess surface 60*d* of the nozzle body 32*c*.

Similar to the cover plate 102, the baffle plate 120 can be a substantially rectangular shaped plastic or metallic component. The baffle plate 120 can define a body 124 that has a front surface 124*a*, a rear surface 124*b* opposite the front surface 124*a* along the lateral direction 4, an upper surface 124*c*, a lower surface 124*d* opposite the upper surface 124*c* along the vertical direction 6, a first side surface 124*e*, and a second side surface 124*f* opposite the first side surface 124*e* along the longitudinal direction 2. The baffle plate 120 can also include a lip 128 that substantially matches the lip 108 of the cover plate 102. As such, the lip 128 can embody a substantially rectangular protrusion that extends from the lower surface 124*d* along the vertical direction 6 and along the lower surface 124*d* in the longitudinal direction 2. Additionally, the baffle plate 120 can define bores 132*a*, 132*b* that extend from the front surface 124*a* to the rear surface 124*b* along the lateral direction 4. Each of the bores 132*a*, 132*b* is configured to receive a respective fastener 64. Though the baffle plate 120 is shown as including two bores 132*a*, 132*b*, the baffle plate 120 can include more or less bores as desired. However, like the cover plate 102, the number of bores included in the baffle plate 120 will generally correspond to the number of bores defined by the rear recess surface 60*d* of the nozzle body 32*c*.

The baffle plate 120 can also include the features of the slotted nozzle assembly 100*a* that allow the adhesive to flow through the slotted nozzle assembly 100*a*. The baffle plate 120 can define an input recess 136 that extends into the body 124 of the baffle plate 120 from the rear surface 124*b* along the lateral direction 4. The input recess 136 can be substantially rectangular shaped, though other shapes are contemplated. At the top of the input recess 136, the baffle plate 120 can have a slot 140 that extends through the baffle plate 120 from the rear surface 124*b* to the front surface 124*a*. The baffle plate 120 can include a plurality of inner surfaces that define the slot 140. Specifically, the baffle plate 120 can have first and second slot surface 144*a*, 144*b* that define the lower side of the slot 140, as well as a third slot surface 144*c* that is spaced from the first and second slot surface 144*a*, 144*b* along the vertical direction 6 and defines the upper side of the slot 140. The first and third slot surfaces 144*a*, 144*c* can each be substantially planar surfaces, while the second slot surface 144*b* can be a substantially curved, semicircular surface. Though one specific arrangement and design of slot surfaces 144*a*-144*c* are depicted, other embodiments and designs are contemplated. Notably, the slot 140 is depicted as spaced in an entirety from the upper surface 124*c* and the lower surface 124*d*. However, it is contemplated that the slot 140 could extend into the body 124 from the upper surface 124*c*. Opposite the input recess 136, the baffle plate 120 can define an output recess 148 that extends into the body 124 of the baffle plate 120 from the front surface 124*a* along the lateral direction 4. The output recess 148 can be substantially rectangular shaped, though other shapes are contemplated, and can extend from the slot 140 to the bottom of the lip 128 of the baffle plate 120. The output recess 148 can define a width $W_1$ measured along the longitudinal direction 2, where the width $W_1$ can be from about 4 mm to about 20 mm.

Figure 8A:
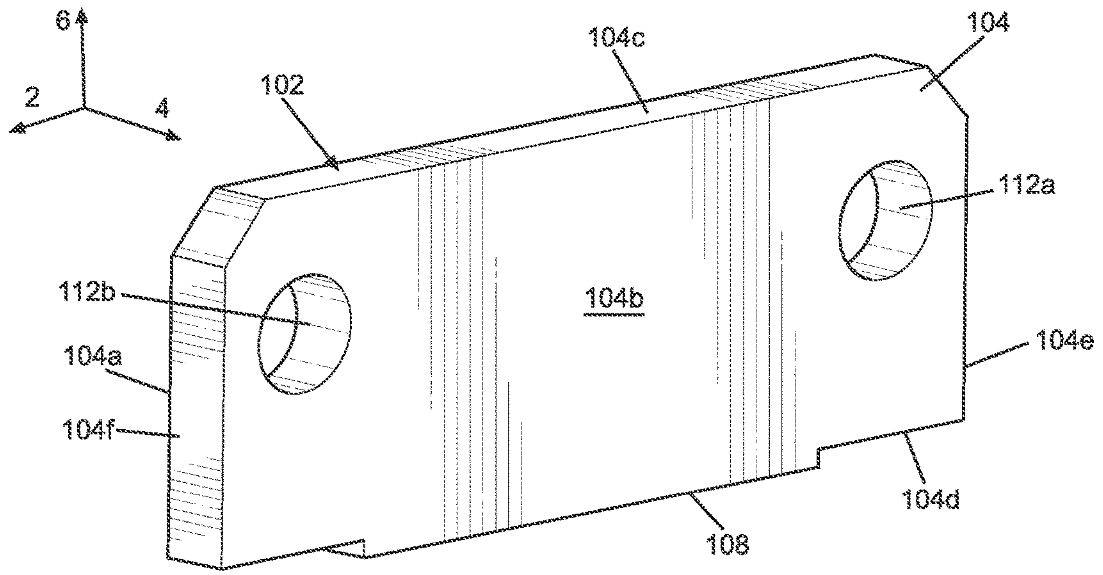
FIG. 8A is a rear perspective view of a cover plate of a slotted nozzle assembly according to a first embodiment of the present disclosure.
Figure 8B:
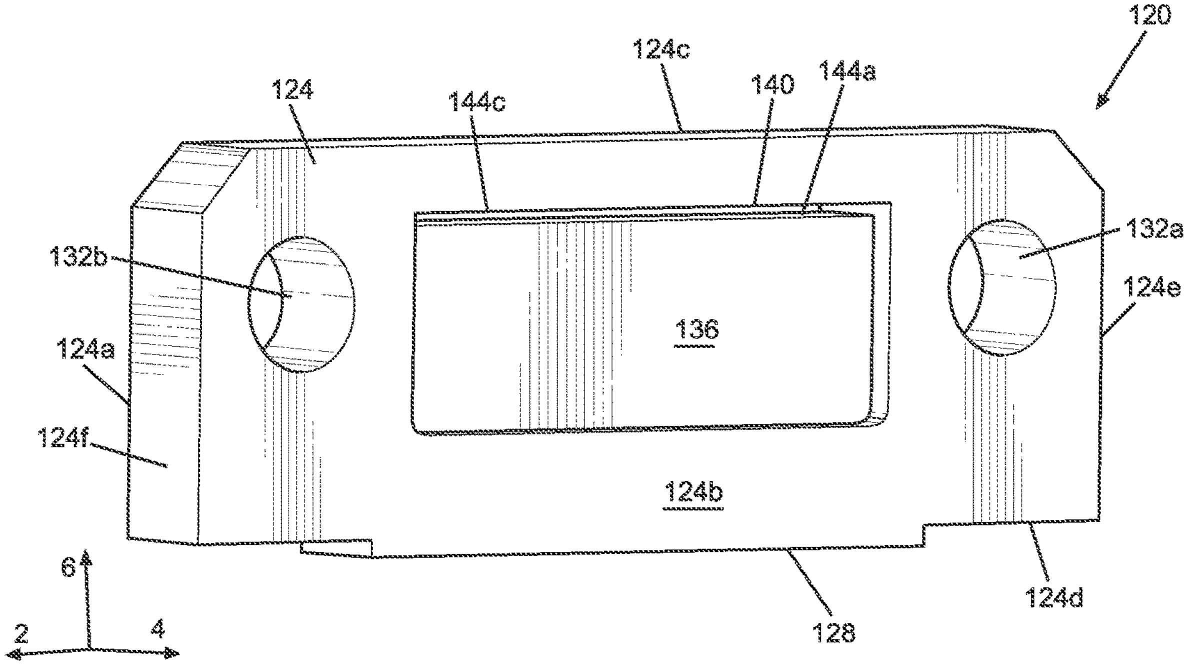
FIG. 8B is a rear perspective view of a baffle plate of the first embodiment of the slotted nozzle assembly.
Figure 8C:
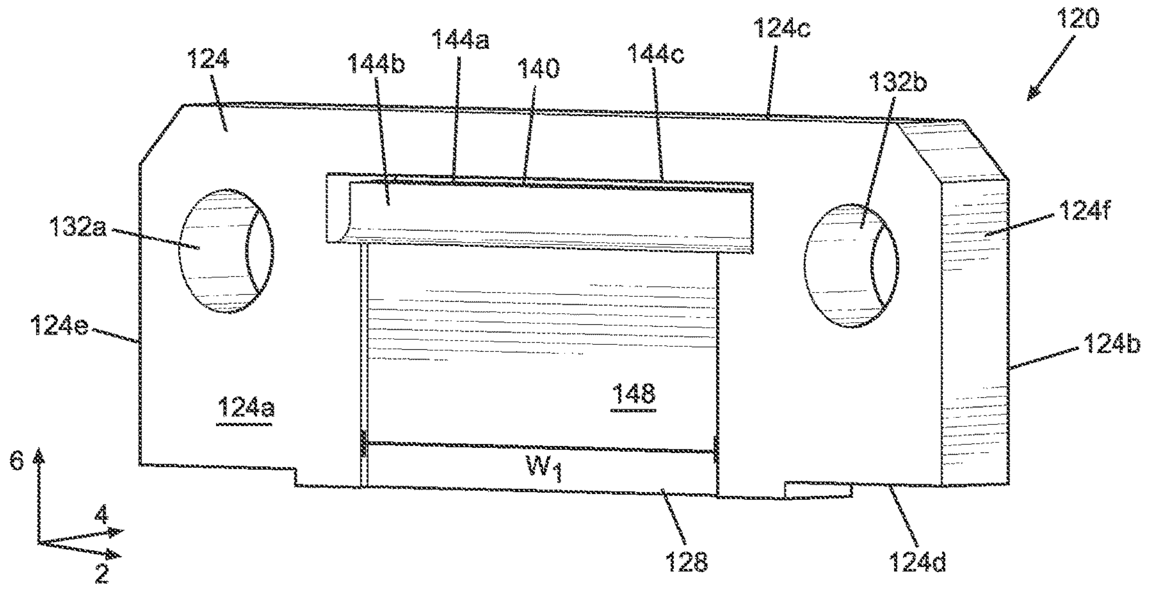
FIG. 8C is a front perspective view of the baffle plate of the first embodiment of the slotted nozzle assembly.
Figure 8D:
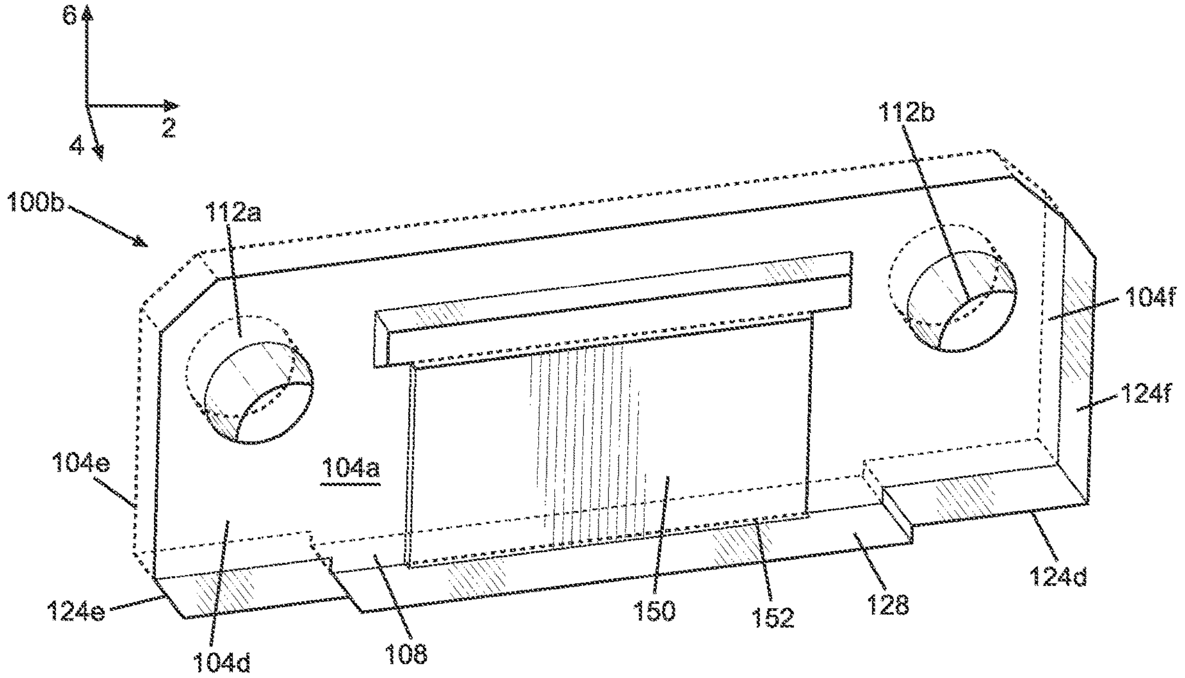
FIG. 8D is a bottom perspective view of the first embodiment of the slotted nozzle assembly.
Figure 8E:
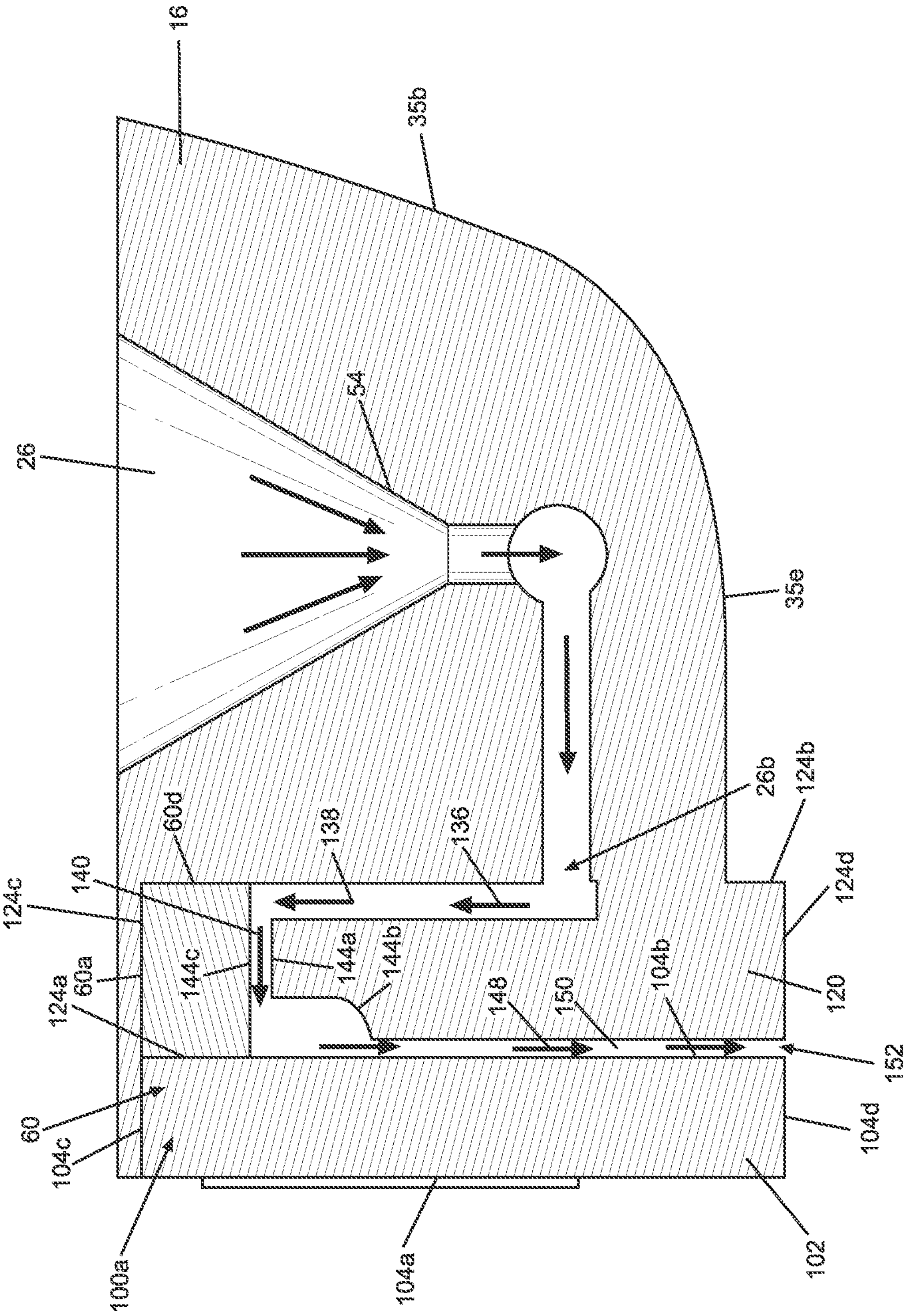
FIG. 8E is a cross-sectional view of the first embodiment of the slotted nozzle assembly attached to the nozzle body, as noted by the encircled region in FIG. 5.
Figure 8F:
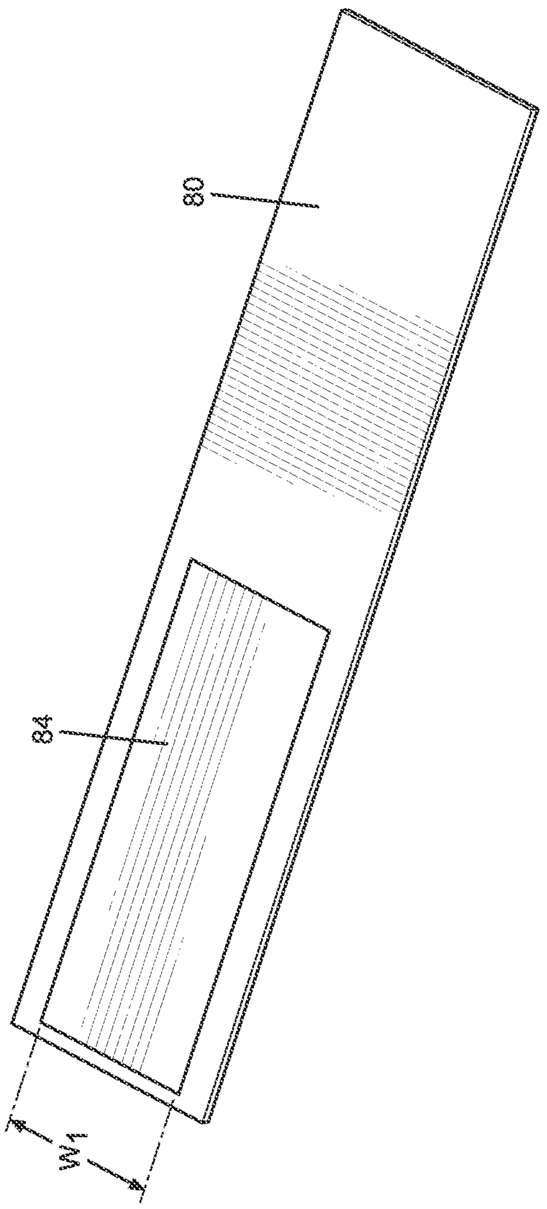
FIG. 8F is a perspective view of a substrate with an adhesive pattern applied using the first embodiment of the slotted nozzle assembly.

With specific reference to FIG. 8E, the slotted nozzle assembly 100*a* is shown fully assembled and connected to the pump 16. Specifically, the slotted nozzle assembly 100*a* is shaped and sized to be received in the recess 60 of the pump body assembly 32. To attach the slotted nozzle assembly 100*a* to the pump 16, the bores 112*a*, 112*b* of the cover plate are aligned with the bores 132*a*, 132*b* of the baffle plate 120 and the bores 62*a*, 62*b* of the nozzle body 32*c*. Then, a fastener 64 is disposed through bores 112*a*, 132*a*, 62*a* while another fastener 64 is disposed through bores 112*b*, 132*b*, 62*b*, and the fasteners 64 engage the nozzle body 32*c* to releasably couple the slotted nozzle assembly 100*a* to the pump 16. When attached to the pump 16, the upper surface 104*c* of the cover plate 102 and the upper surface 124*c* of the baffle plate 120 can engage the upper recess surface 60*a*, while the rear surface 124*b* of the baffle plate 120 can engage the rear recess surface 60*d*. Additionally, the first side surface 104*e* of the cover plate 102 and the first side surface 124*e* of the baffle plate 120 can engage the first side recess surface 60*b*, while the second side surface 104*f* of the cover plate 102 and the second side surface 124*f* of the baffle plate 120 can engage the second side recess surface 60*c*. The front surface 104*a* of the cover plate 102 can be substantially coplanar with the front surface 35*a* of the nozzle body 32*c*, while the lower surfaces 104*d*, 124*d* of the cover plate 102 and baffle plate 120, respectively, can be positioned below the lower surface 35*e* of the nozzle body 32*c* along the vertical 6.

Figure 12:
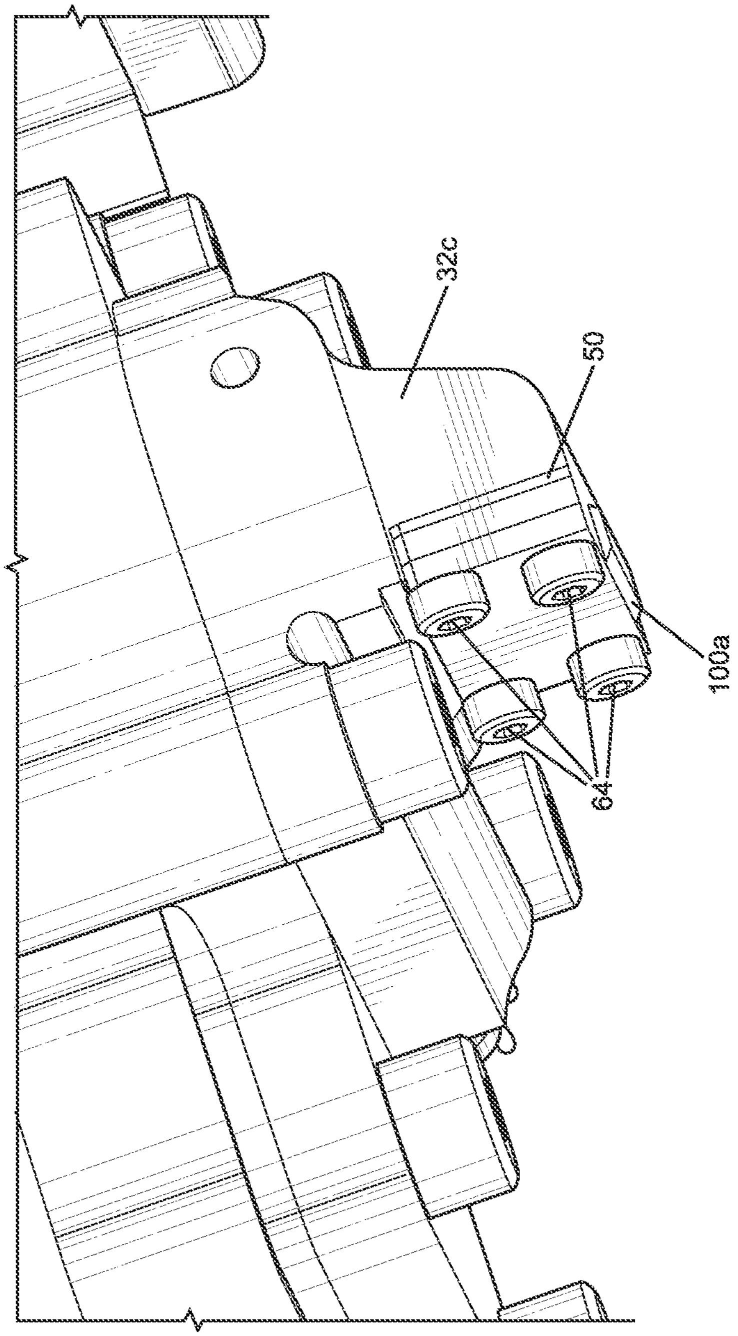
FIG. 12 is an isometric perspective view of an adhesive dispenser according to another embodiment of the present disclosure.

Gaskets or other sealing components may be disposed throughout the adhesive dispenser 10. In some aspects, one or more sealing gaskets may be disposed between the valve seat 54 and the dispensing outlet 152 to prevent leakage of the adhesive. Referring, for example, to FIG. 12, a gasket 50 may be disposed between the nozzle body 32*c* and the slotted nozzle assembly 100*a*. It will be appreciated that any suitable sealing gasket may be used, such as flat washers or rounded or semi-rounded washers, and that they may vary in shape and size to form the proper seals between adjacent components.

Figure 9A:
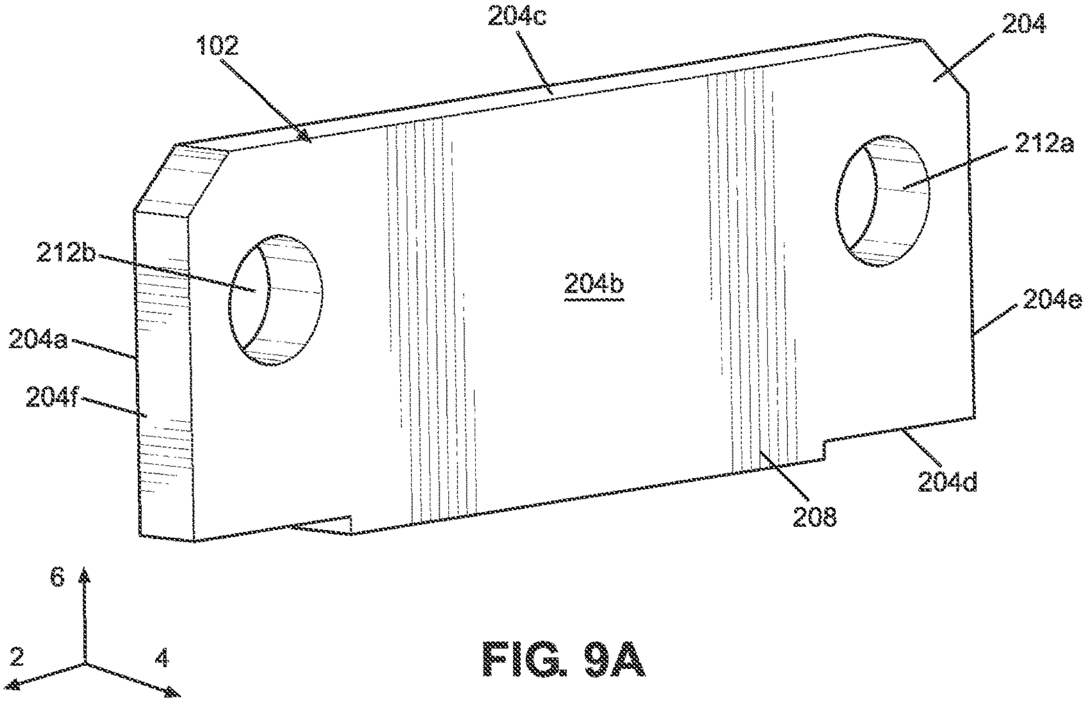
FIG. 9A is a rear perspective view of a cover plate of a slotted nozzle assembly according to a second embodiment of the present disclosure.
Figure 9B:
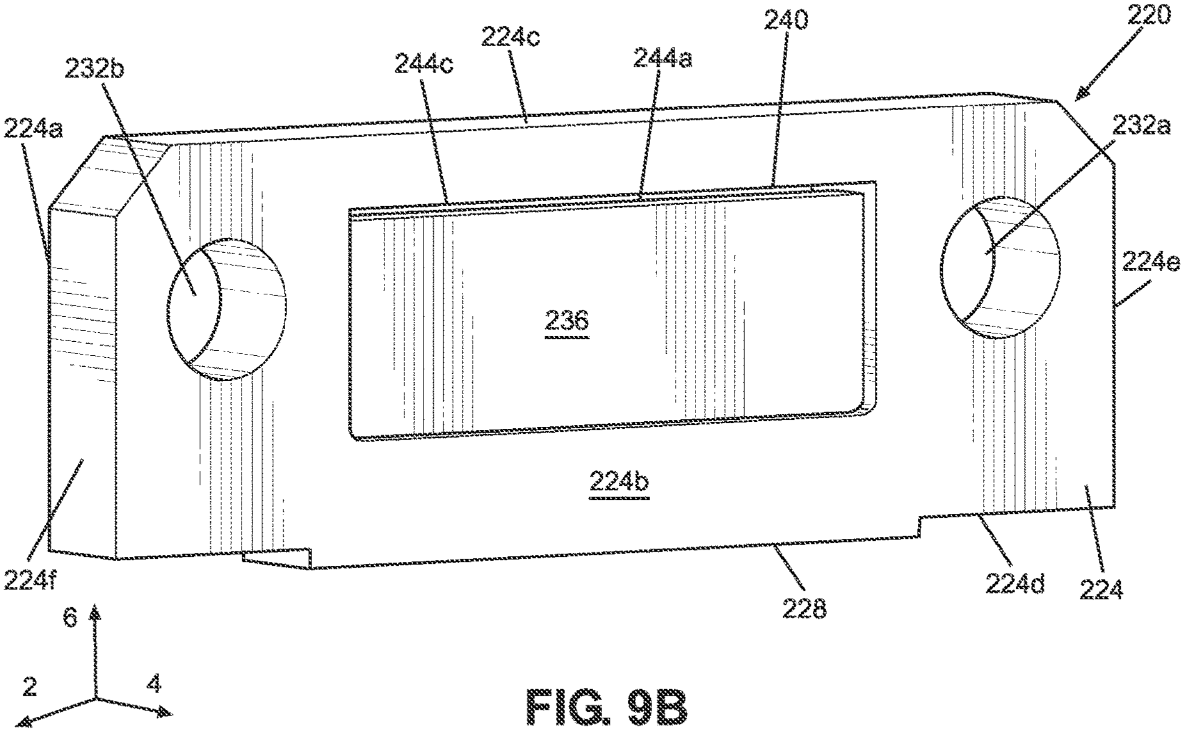
FIG. 9B is a rear perspective view of a baffle plate of the second embodiment of the slotted nozzle assembly.
Figure 9C:
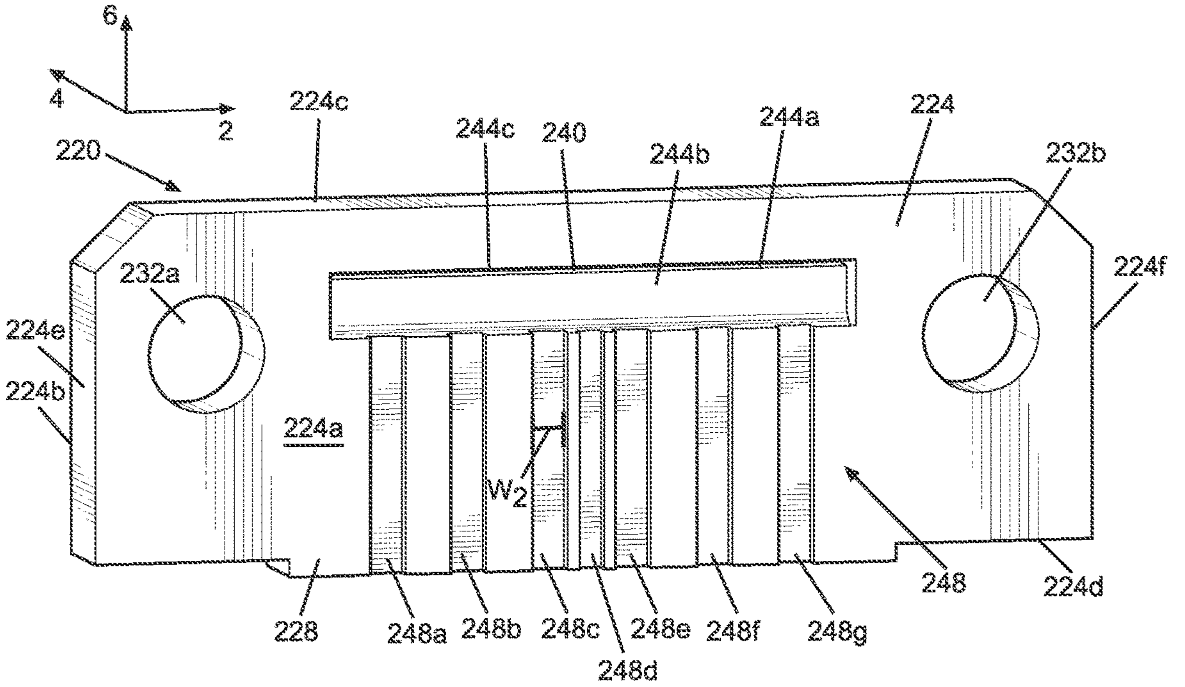
FIG. 9C is a front perspective view of the baffle plate of the second embodiment of the slotted nozzle assembly.
Figure 9D:
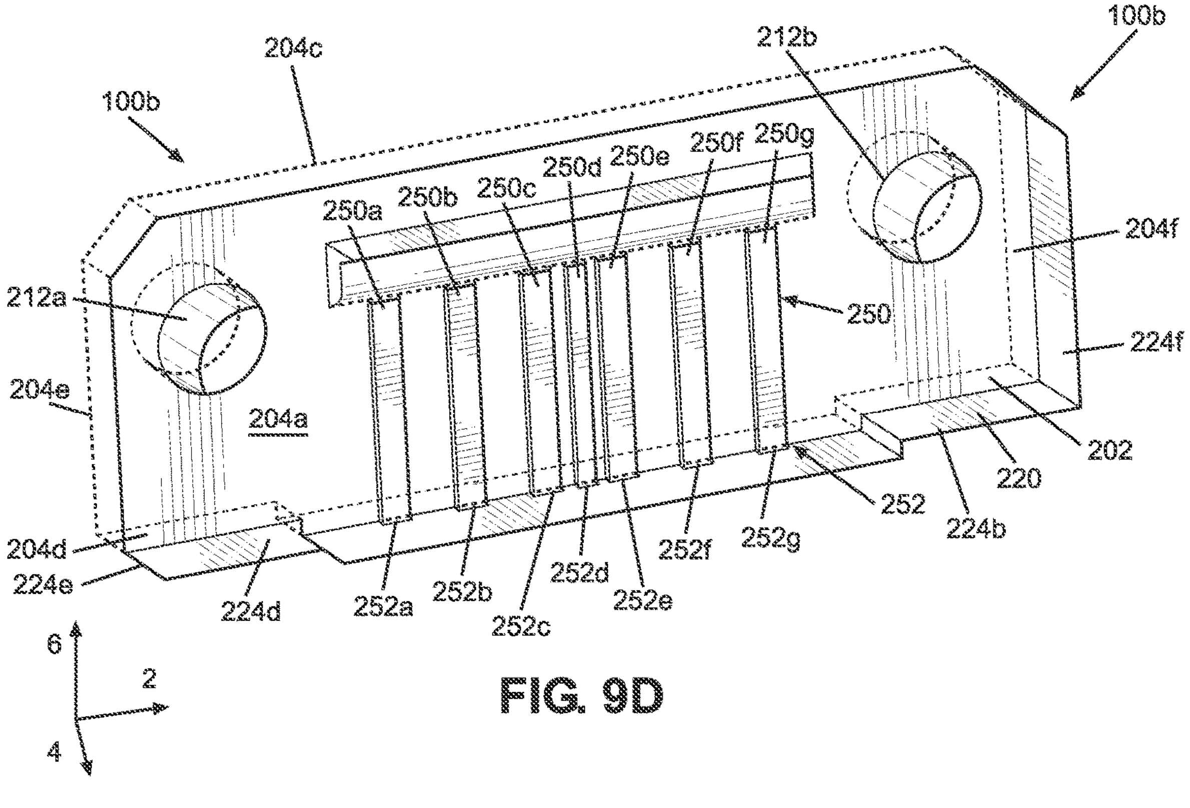
FIG. 9D is a bottom perspective view of the second embodiment of the slotted nozzle assembly.
Figure 9E:
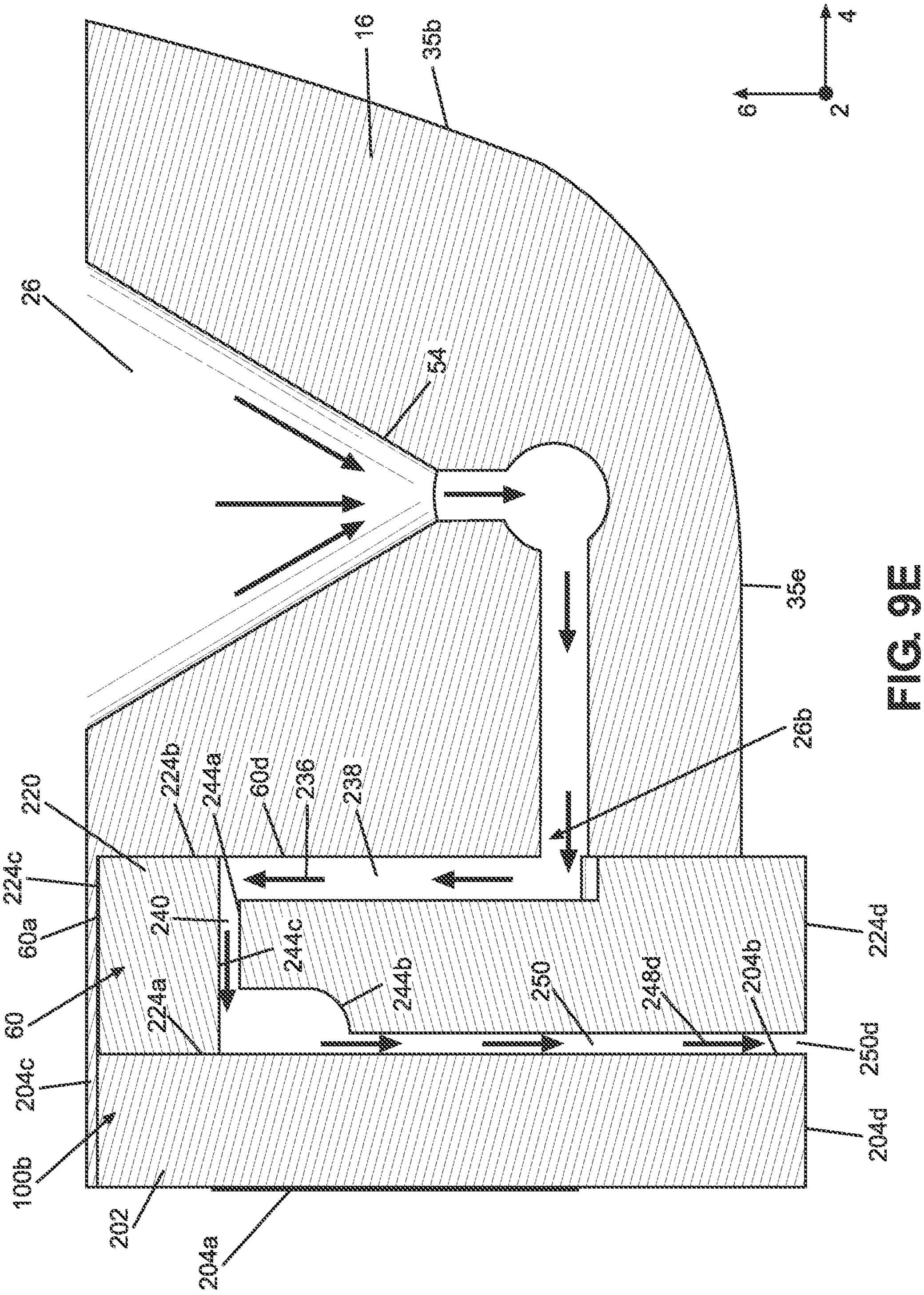
FIG. 9E is a cross-sectional view of the second embodiment of the slotted nozzle assembly attached to the nozzle body.

FIG. 9E also shows the flow path of adhesive as it flows through the pump 16 and slotted nozzle assembly 100*a*, where the direction of fluid flow is indicated by solid arrows. When the cover plate 102 and baffle plate 120 are secured to the nozzle body 32*c*, an input channel 138 that receives adhesive from the outlet 26*b* of the fluid channel 26 is defined between the baffle plate 120 and the nozzle body 32*c*. Specifically, the input channel 138 is defined by the input recess 136 of the baffle plate 120 and the rear recess surface 60*d* of the nozzle body 32*c*. The input channel 138 extends from the outlet 26*b* of the fluid channel 26 to the slot 140, which, as noted above, extends through the entirety of the baffle plate 120. The slotted nozzle assembly 100*a* also defines an output channel 150 between the baffle plate 120 and the cover plate 102. Specifically, the output channel 150 is defined by the output recess 148 of the baffle plate 120 and the rear surface 104*b* of the cover plate 102. The output channel 150 extends from the slot 140 and terminates at the dispensing outlet 152, from which adhesive is applied to the substrate 80. As shown in FIGS. 9D-9E, the dispensing outlet 152 of the slotted nozzle assembly 100*a* takes the form of a single, elongate slot so as to produce an adhesive pattern that comprises a continuous adhesive strip 84 having a width $W_1$ on the substrate 80. As such, when the valve member 48 of the pump 16 is in a retracted position, adhesive can flow past the valve seat 54, through the outlet 26*b* of the fluid channel 26, and into the input channel 138. From there, the adhesive flows vertically up through the input channel 138, laterally through the slot 140, downwardly through the output channel 150, and through the dispensing outlet 152 and onto the substrate 80.

Referring to FIGS. 9A-9E, a second embodiment of a slotted nozzle assembly 100*b* and its constituent components are depicted. Like the slotted nozzle assembly 100*a*, the slotted nozzle assembly 100*b* can comprise a cover plate 202 and a baffle plate 220. The cover plate 202 can be a substantially rectangular shaped plastic or metallic component. The cover plate 202 can define a body 204 that has a front surface 204*a*, a rear surface 204*b* opposite the front surface 204*a* along the lateral direction 4, an upper surface 204*c*, a lower surface 204*d* opposite the upper surface 204*c* along the vertical direction 6, a first side surface 204*e*, and a second side surface 204*f* opposite the first side surface 204*e* along the longitudinal direction 2. The cover plate 202 can also include a lip 208 embodying a substantially rectangular protrusion that extends from the lower surface 204*d* along the vertical direction 6 and along the lower surface 204*d* in the longitudinal direction 2. Additionally, the cover plate 202 can define bores 212*a*, 212*b* that extend from the front surface 204*a* to the rear surface 204*b* along the lateral direction 4. Each of the bores 212*a*, 212*b* is configured to receive a respective fastener 64. Though the cover plate 202 is shown as including two bores 212*a*, 212*b*, the cover plate 202 can include more or less bores as desired. However, the number of bores included in the cover plate 202 will generally correspond to the number of bores defined by the rear recess surface 60*d* of the nozzle body 32*c*. In some aspects, the cover plate 202 may be fastened via 2, 4, or another suitable number of fasteners 64. Referring to the exemplary aspect depicted in FIG. 12, for example, four fasteners 64 may be used.

Similar to the cover plate 202, the baffle plate 220 can be a substantially rectangular shaped plastic or metallic component. The baffle plate 220 can define a body 224 that has a front surface 224*a*, a rear surface 224*b* opposite the front surface 224*a* along the lateral direction 4, an upper surface 224*c*, a lower surface 224*d* opposite the upper surface 224*c* along the vertical direction 6, a first side surface 224*e*, and a second side surface 224*f* opposite the first side surface 224*e* along the longitudinal direction 2. The baffle plate 220 can also include a lip 228 that substantially matches the lip 208 of the cover plate 202. As such, the lip 228 can embody a substantially rectangular protrusion that extends from the lower surface 224*d* along the vertical direction 6 and along the lower surface 224*d* in the longitudinal direction 2. Additionally, the baffle plate 220 can define bores 232*a*, 232*b* that extend from the front surface 224*a* to the rear surface 224*b* along the lateral direction 4. Each of the bores 232*a*, 232*b* is configured to receive a respective fastener 64. Though the baffle plate 220 is shown as including two bores 232*a*, 232*b*, the baffle plate 220 can include more or less bores as desired. However, like the cover plate 202, the number of bores included in the baffle plate 220 will generally correspond to the number of bores defined by the rear recess surface 60*d* of the nozzle body 32*c*.

The baffle plate 220 can also include the features of the slotted nozzle assembly 100*b* that allow the adhesive to flow through the slotted nozzle assembly 100*b*. The baffle plate 220 can define an input recess 236 that extends into the body 224 of the baffle plate 220 from the rear surface 224*b* along the lateral direction 4. The input recess 236 can be substantially rectangular shaped, though other shapes are contemplated. At the top of the input recess 236, the baffle plate 220 can have a slot 240 that extends through the baffle plate 220 from the rear surface 224*b* to the front surface 224*a*. The baffle plate 220 can include a plurality of inner surfaces that define the slot 240. Specifically, the baffle plate 220 can have first and second slot surface 244*a*, 244*b* that define the lower side of the slot 240, as well as a third slot surface 244*c* that is spaced from the first and second slot surface 244*a*, 244*b* along the vertical direction 6 and defines the upper side of the slot 240. The first and third slot surfaces 244*a*, 244*c* can each be substantially planar surfaces, while the second slot surface 244*b* can be a substantially curved, semicircular surface. Though one specific arrangement and design of slot surfaces 244*a*-244*c* are depicted, other embodiments and designs are contemplated. Notably, the slot 240 is depicted as spaced in an entirety from the upper surface 224*c* and the lower surface 224*d*. However, it is contemplated that the slot 240 could extend into the body 224 from the upper surface 224*c*. Opposite the input recess 236, the baffle plate 220 can define a plurality of output recesses 248 that extend into the body 224 of the baffle plate 220 from the front surface 224*a* along the lateral direction 4. As depicted, the baffle plate 220 includes seven output recesses 248*a*-248*g* that extend generally parallel to each other and are spaced apart along the longitudinal direction 2. However, the baffle plate 220 can include anywhere from two to ten output recesses 248. The output recesses 248*a*-248*g* can be substantially rectangular shaped, though other shapes are contemplated, and can extend from the slot 240 to the bottom of the lip 228 of the baffle plate 220. The output recesses 248*a*-248*g* can define a width $W_2$ measured along the longitudinal direction 2, where the width $W_2$ can be from about 0.5 mm to about 1 mm. As shown, each of the plurality of output recesses 248 does not define the same width. Also, the plurality of output recesses are non-equidistantly spaced apart along the longitudinal 2.

With specific reference to FIG. 9E, the slotted nozzle assembly 100*b* is shown fully assembled and connected to the pump 16. Specifically, the slotted nozzle assembly 100*b* is shaped and sized to be received in the recess 60 of the pump body assembly 32. To attach the slotted nozzle assembly 100*b* to the pump 16, the bores 212*a*, 212*b* of the cover plate 202 are aligned with the bores 232*a*, 232*b* of the baffle plate 220 and the bores 62*a*, 62*b* of the nozzle body 32*c*. Then, a fastener 64 is disposed through bores 212*a*, 232*a*, 62*a* while another fastener 64 is disposed through bores 212*b*, 232*b*, 62*b*, and the fasteners 64 engage the nozzle body 32*c* to releasably couple the slotted nozzle assembly 100*b* to the pump 16. When attached to the pump 16, the upper surface 204*c* of the cover plate 202 and the upper surface 224*c* of the baffle plate 220 can engage the upper recess surface 60*a*, while the rear surface 224*b* of the baffle plate 220 can engage the rear recess surface 60*d*. Additionally, the first side surface 204*e* of the cover plate 202 and the first side surface 224*e* of the baffle plate 220 can engage the first side recess surface 60*b*, while the second side surface 204*f* of the cover plate 202 and the second side surface 224*f* of the baffle plate 220 can engage the second side recess surface 60*c*. The front surface 104*a* of the cover plate 202 can be substantially coplanar with the front surface 35*a* of the nozzle body 32*c*, while the lower surfaces 204*d*, 224*d* of the cover plate 202 and baffle plate 220, respectively, can be positioned below the lower surface 35*e* of the nozzle body 32*c* along the vertical direction 6.

FIG. 9E also shows the flow path of adhesive as it flows through the pump 16 and slotted nozzle assembly 100*b*, where the direction of fluid flow is indicated by solid arrows. When the cover plate 202 and baffle plate 220 are secured to the nozzle body 32*c*, an input channel 238 that receives adhesive from the outlet 26*b* of the fluid channel 26 is defined between the baffle plate 220 and the nozzle body 32*c*. Specifically, the input channel 238 is defined by the input recess 236 of the baffle plate 220 and the rear recess surface 60*d* of the nozzle body 32*c*. The input channel 238 extends from the outlet 26*b* of the fluid channel 26 to the slot 240, which, as noted above, extends through the entirety of the baffle plate 220. The slotted nozzle assembly 100*b* also defines a plurality of output channels 250*a*-250*g* between the baffle plate 220 and the cover plate 202. Specifically, the plurality of output channels 250*a*-250*g* are each defined by a respective one of the output recesses 248*a*-248*g* of the baffle plate 220 and the rear surface 204*b* of the cover plate 202. The plurality of output channels 250*a*-250*g* each extend from the slot 240 and terminate at a respective dispensing outlet 252*a*-252*g*, from which adhesive is applied to the substrate 80. Because the baffle plate 220 can have between two and ten output recesses 248, the nozzle assembly 100*b* can similarly have between two and ten output channels 250 and between two and ten dispensing outlets 252. As shown in FIG. 9D, the dispensing outlets 252*a*-252*g* of the slotted nozzle assembly 100*b* take the form of longitudinally spaced apart slots so as to produce an adhesive pattern that comprises an array of adhesive dots. Thus, when the valve member 48 of the pump 16 is in a retracted position, adhesive can flow past the valve seat 54, through the outlet 26*b* of the fluid channel 26, and into the input channel 238. From there, the adhesive flows vertically up through the input channel 238, laterally through the slot 240, downwardly through the output channels 250*a*-250*g*, and through the dispensing outlets 252*a*-252*g* and onto the substrate 80. Because the output recesses 248*a*-248*g*, and thus the dispensing outlets 252*a*-252*g* have varying widths and are not equidistantly spaced apart, the resulting array of dispensed adhesive dots will similarly have such spacing and size differences.

Referring to FIGS. 10A-10F, a third embodiment of a slotted nozzle assembly 100*c* and its constituent components are depicted. Like the slotted nozzle assemblies 100*a*, 100*b*, the slotted nozzle assembly 100*c* can comprise a cover plate 302 and a baffle plate 320. The cover plate 302 can be a substantially rectangular shaped plastic or metallic component. The cover plate 302 can define a body 304 that has a front surface 304*a*, a rear surface 304*b* opposite the front surface 304*a* along the lateral direction 4, an upper surface 304*c*, a lower surface 304*d* opposite the upper surface 304*c* along the vertical direction 6, a first side surface 304*e*, and a second side surface 304*f* opposite the first side surface 304*e* along the longitudinal direction 2. The cover plate 302 can also include a lip 308 embodying a substantially rectangular protrusion that extends from the lower surface 304*d* along the vertical direction 6 and along the lower surface 304*d* in the longitudinal direction 2. Additionally, the cover plate 302 can define bores 312*a*, 312*b* that extend from the front surface 304*a* to the rear surface 304*b* along the lateral direction 4. Each of the bores 312*a*, 312*b* is configured to receive a respective fastener 64. Though the cover plate 302 is shown as including two bores 312*a*, 312*b*, the cover plate 302 can include more or less bores as desired. However, the number of bores included in the cover plate 302 will generally correspond to the number of bores defined by the rear recess surface 60*d* of the nozzle body 32*c*.

Similar to the cover plate 302, the baffle plate 320 can be a substantially rectangular shaped plastic or metallic component. The baffle plate 320 can define a body 324 that has a front surface 324*a*, a rear surface 324*b* opposite the front surface 324*a* along the lateral direction 4, an upper surface 324*c*, a lower surface 324*d* opposite the upper surface 324*c* along the vertical direction 6, a first side surface 324*e*, and a second side surface 324*f* opposite the first side surface 324*e* along the longitudinal direction 2. The baffle plate 320 can also include a lip 328 that substantially matches the lip 308 of the cover plate 302. As such, the lip 328 can embody a substantially rectangular protrusion that extends from the lower surface 324*d* along the vertical direction 6 and along the lower surface 324*d* in the longitudinal direction 2. Additionally, the baffle plate 320 can define bores 332*a*, 332*b* that extend from the front surface 324*a* to the rear surface 324*b* along the lateral direction 4. Each of the bores 332*a*, 332*b* is configured to receive a respective fastener 64. Though the baffle plate 320 is shown as including two bores 332*a*, 332*b*, the baffle plate 320 can include more or less bores as desired. However, like the cover plate 302, the number of bores included in the baffle plate 320 will generally correspond to the number of bores defined by the rear recess surface 60*d* of the nozzle body 32*c*.

The baffle plate 320 can also include the features of the slotted nozzle assembly 100*c* that allow the adhesive to flow through the slotted nozzle assembly 100*c*. The baffle plate 320 can define an input recess 336 that extends into the body 324 of the baffle plate 320 from the rear surface 324*b* along the lateral direction 4. The input recess 336 can be substantially rectangular shaped, though other shapes are contemplated. At the top of the input recess 336, the baffle plate 320 can have a slot 340 that extends through the baffle plate 320 from the rear surface 324*b* to the front surface 324*a*. The baffle plate 320 can include a plurality of inner surfaces that define the slot 340. Specifically, the baffle plate 320 can have first and second slot surfaces 344*a*, 344*b* that define the lower side of the slot 340, as well as a third slot surface 344*c* that is spaced from the first and second slot surfaces 344*a*, 344*b* along the vertical direction 6 and defines the upper side of the slot 340. The first and third slot surfaces 344*a*, 344*c* can each be substantially planar surfaces, while the second slot surface 344*b* can be a substantially curved, semicircular surface. Though one specific arrangement and design of slot surfaces 344*a*-344*c* are depicted, other embodiments and designs are contemplated. Notably, the slot 340 is depicted as spaced in an entirety from the upper surface 324*c* and the lower surface 324*d*. However, it is contemplated that the slot 340 could extend into the body 324 from the upper surface 324*c*. Opposite the input recess 336, the baffle plate 320 can define a plurality of output recesses 348 that extend into the body 324 of the baffle plate 320 from the front surface 324*a* along the lateral direction 4. As depicted, the baffle plate 320 includes six output recesses 348*a*-348*f* that extend generally parallel to each other and are spaced apart along the longitudinal direction 2. However, the baffle plate 320 can include anywhere from two to ten output recesses 348. The output recesses 348*a*-348*f* can be substantially rectangular shaped, though other shapes are contemplated, and can extend from the slot 340 to the bottom of the lip 328 of the baffle plate 320. The output recesses 348*a*-348*f* can each define a width $W_3$ measured along the longitudinal direction 2, where the width $W_3$ can be from about 0.5 mm to about 1 mm. As shown, each of the output recesses 348*a*-348*f* defines the same width. Also, the output recesses 348*a*-348*f* are equidistantly spaced apart along the longitudinal direction 2.

Figure 10A:
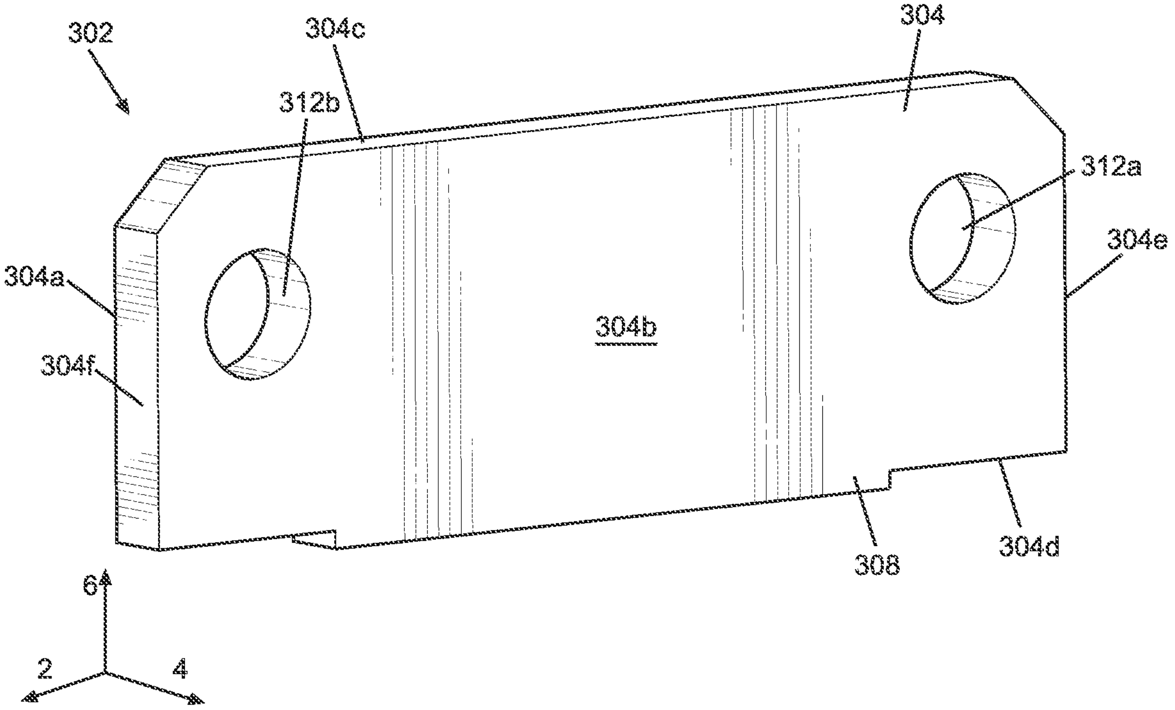
FIG. 10A is a rear perspective view of a cover plate of a slotted nozzle assembly according to a third embodiment of the present disclosure.
Figure 10B:
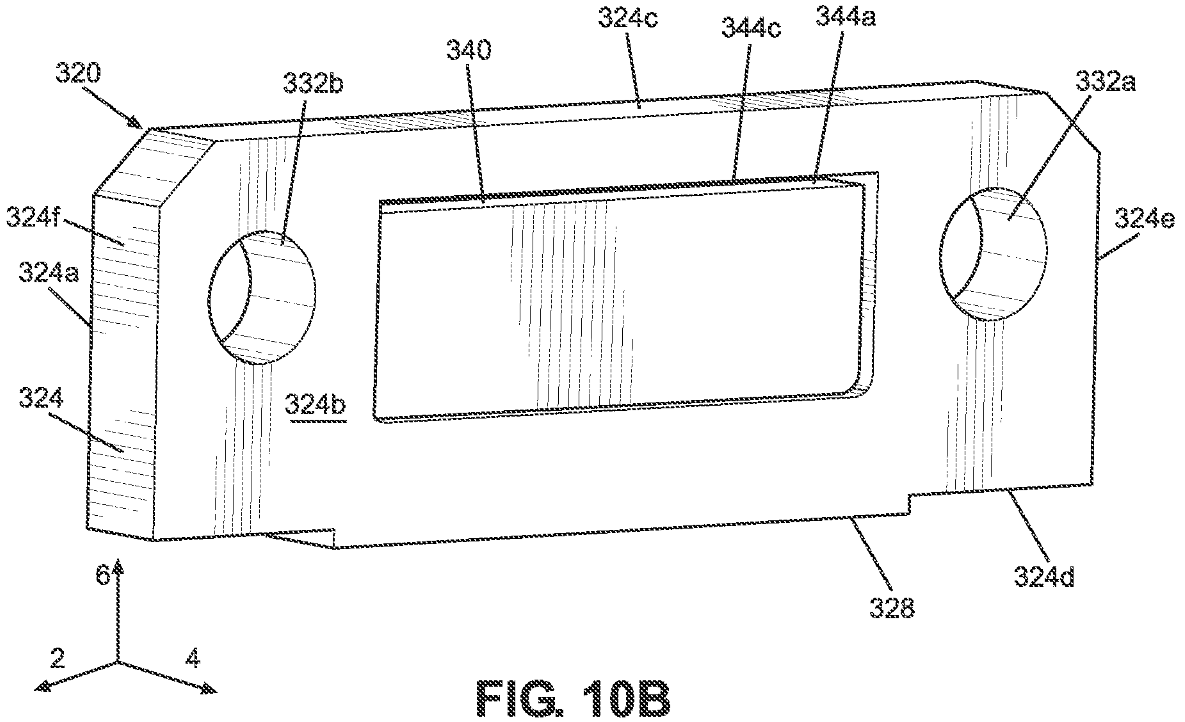
FIG. 10B is a rear perspective view of a baffle plate of the third embodiment of the slotted nozzle assembly.
Figure 10C:
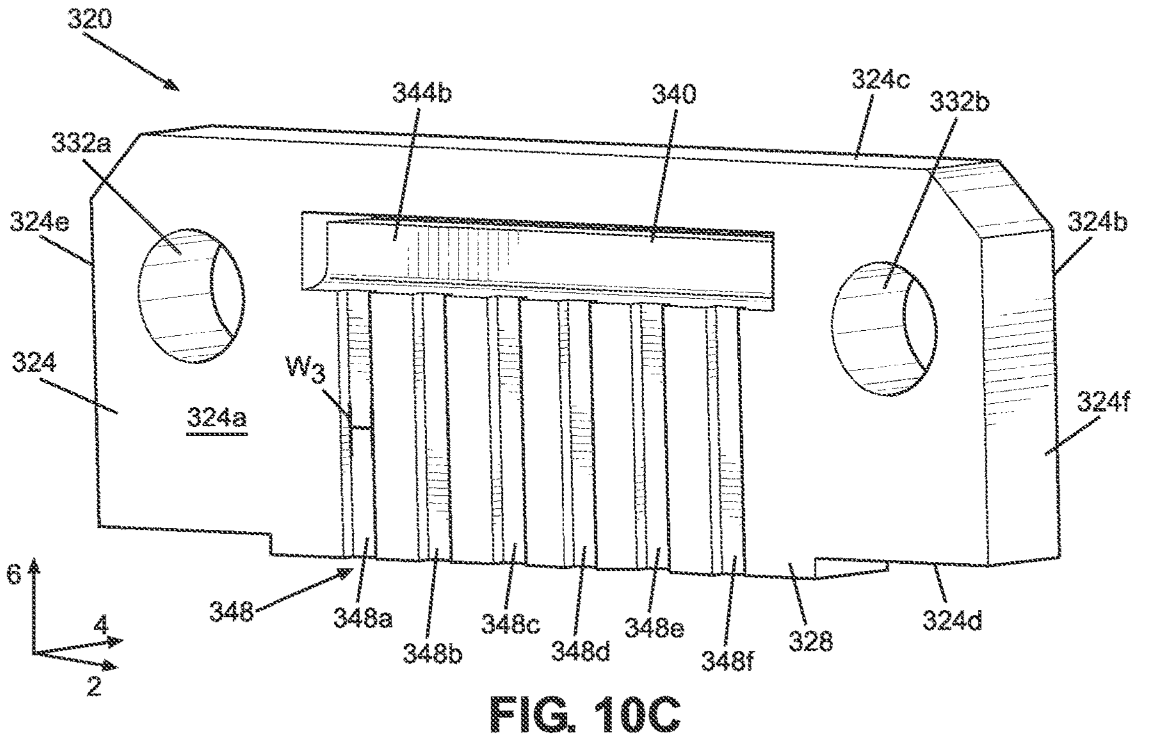
FIG. 10C is a front perspective view of the baffle plate of the third embodiment of the slotted nozzle assembly.
Figure 10D:
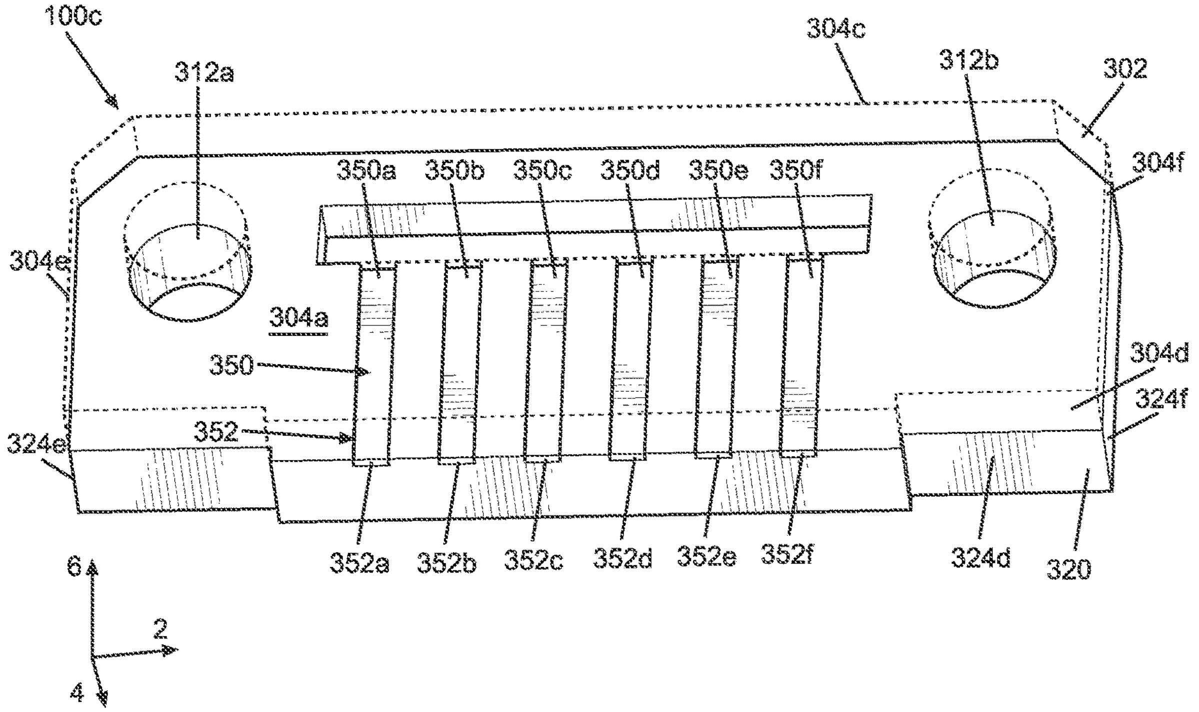
FIG. 10D is a bottom perspective view of the third embodiment of the slotted nozzle assembly.
Figure 10E:
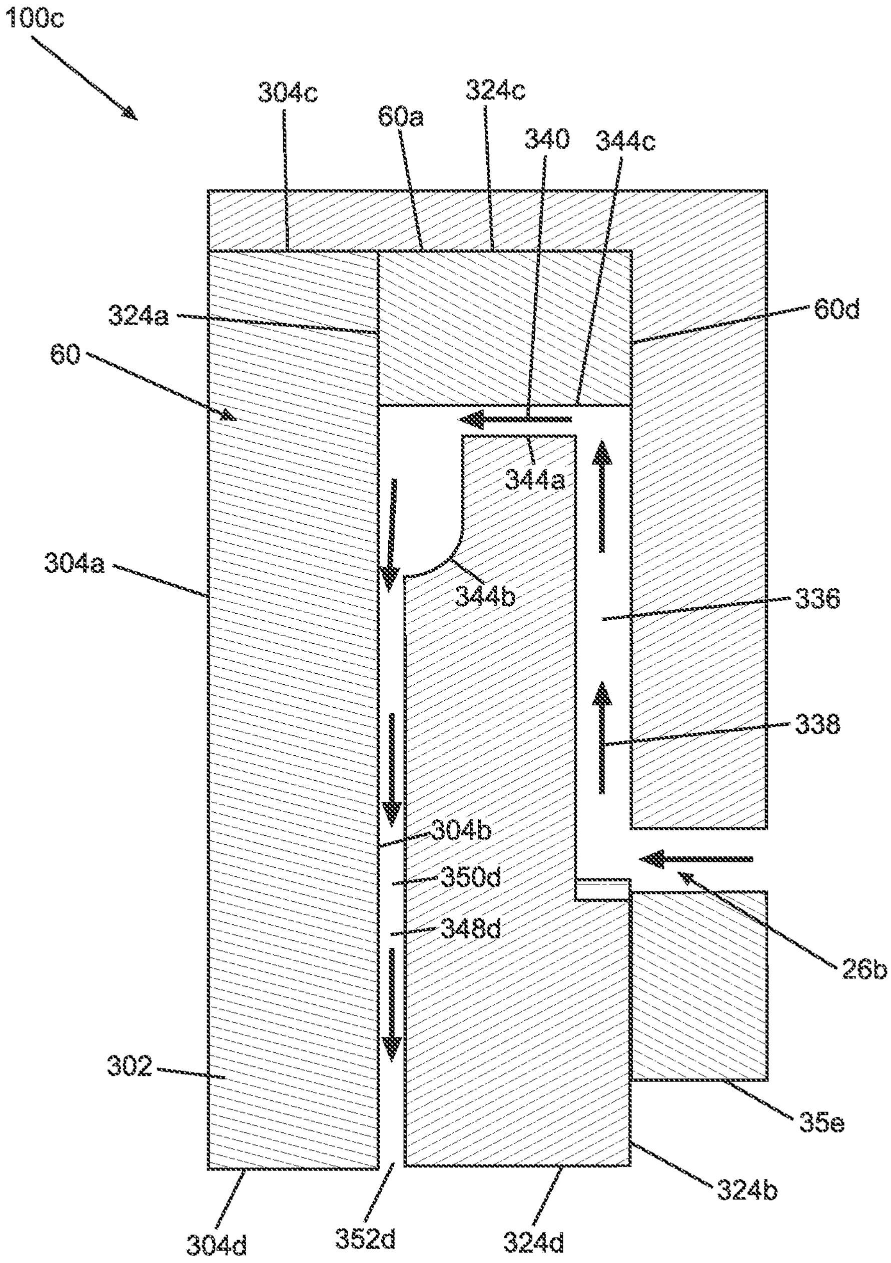
FIG. 10E is a cross-sectional view of the third embodiment of the slotted nozzle assembly attached to the nozzle body.
Figure 10F:
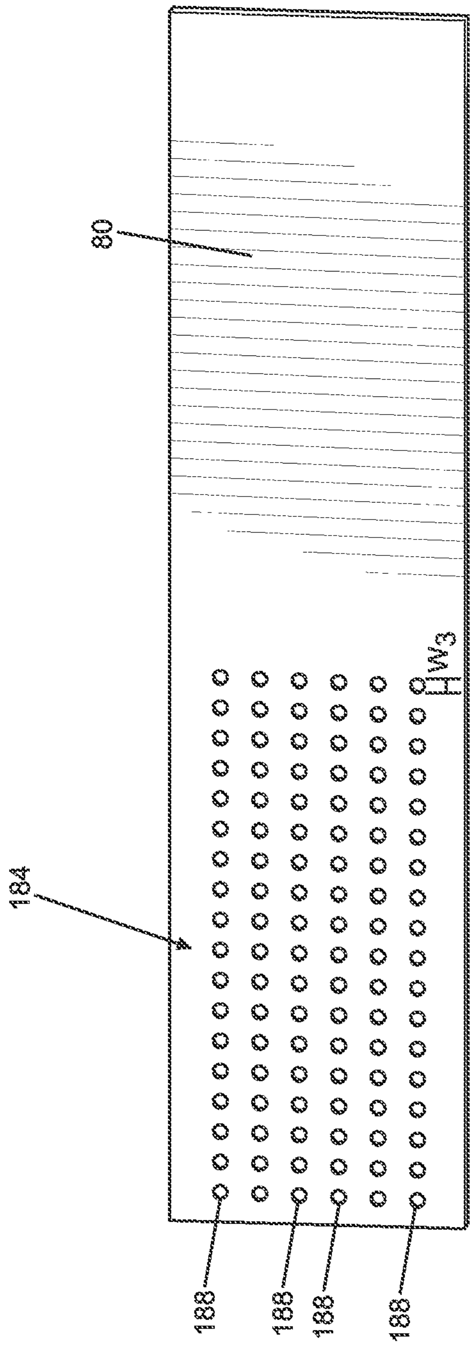
FIG. 10F is a perspective view of a substrate with an adhesive pattern applied using the third embodiment of the slotted nozzle assembly.

With specific reference to FIG. 10E, the slotted nozzle assembly 100*c* is shown fully assembled and connected to the pump 16. Specifically, the slotted nozzle assembly 100*c* is shaped and sized to be received in the recess 60 of the pump body assembly 32. To attach the slotted nozzle assembly 100*c* to the pump 16, the bores 312*a*, 312*b* of the cover plate 302 are aligned with the bores 332*a*, 332*b* of the baffle plate 320 and the bores 62*a*, 62*b* of the nozzle body 32*c*. Then, a fastener 64 is disposed through bores 312*a*, 332*a*, 62*a* while another fastener 64 is disposed through bores 312*b*, 332*b*, 62*b*, and the fasteners are coupled to the nozzle body 32*c* to releasably couple the slotted nozzle assembly 100*c* to the pump 16. When attached to the pump 16, the upper surface 304*c* of the cover plate 302 and the upper surface 324*c* of the baffle plate 320 can engage the upper recess surface 60*a*, while the rear surface 324*b* of the baffle plate 320 can engage the rear recess surface 60*d*. Additionally, the first side surface 304*e* of the cover plate 302 and the first side surface 324*e* of the baffle plate 320 can engage the first side recess surface 60*b*, while the second side surface 304*f* of the cover plate 302 and the second side surface 324*f* of the baffle plate 320 can engage the second side recess surface 60*c*. The front surface 304*a* of the cover plate 302 can be substantially coplanar with the front surface 35*a* of the nozzle body 32*c*, while the lower surfaces 304*d*, 324*d* of the cover plate 302 and baffle plate 320, respectively, can be positioned below the lower surface 35*e* of the nozzle body 32*c* along the vertical direction 6.

FIG. 10E also shows the flow path of adhesive as it flows through the pump 16 and slotted nozzle assembly 100*c*, where the direction of fluid flow is indicated by solid arrows. When the cover plate 302 and baffle plate 320 are secured to the nozzle body 32*c*, an input channel 338 that receives adhesive from the outlet 26*b* of the fluid channel 26 is defined between the baffle plate 320 and the nozzle body 32*c*. Specifically, the input channel 338 is defined by the input recess 336 of the baffle plate 320 and the rear recess surface 60*d* of the nozzle body 32*c*. The input channel 338 extends from the outlet 26*b* of the fluid channel 26 to the slot 340, which, as noted above, extends through the entirety of the baffle plate 320. The slotted nozzle assembly 100*c* also defines a plurality of output channels 350*a*-350*f* between the baffle plate 320 and the cover plate 302. Specifically, the output channels 350*a*-350*f* are each defined by a respective one of the output recesses 348*a*-348*f* of the baffle plate 320 and the rear surface 304*b* of the cover plate 302. The output channels 350*a*-350*f* each extend from the slot 340 and terminate at a respective dispensing outlet 352*a*-352*f*, from which adhesive is applied to the substrate 80. Because the baffle plate 320 can have between two and ten output recesses 348, the nozzle assembly 100*c* can similarly have between two and ten output channels 350 and between two and ten dispensing outlets 352. As shown in FIG. 10D-10E, the dispensing outlets 352*a*-352*f* of the slotted nozzle assembly 100*c* take the form of longitudinally spaced apart slots so as to produce an adhesive pattern 184 on the substrate 80 that comprises an array of adhesive dots 188. Thus, when the valve member 48 of the pump 16 is in a retracted position, adhesive can flow past the valve seat 54, through the outlet 26*b* of the fluid channel 26, and into the input channel 338. From there, the adhesive flows vertically up through the input channel 338, laterally through the slot 340, downwardly through the output channels 350*a*-350*f*, and through the dispensing outlets 352*a*-352*f* and onto the substrate 80. Because the output recesses 348*a*-348*f*, and thus the dispensing outlets 352*a*-352*g* have equal widths and are equidistantly spaced apart, the resulting adhesive pattern 184 will comprise equidistantly spaced and uniform adhesive dots 188. In contrast, the slotted nozzle assembly 100*b* described above will produce a similar adhesive pattern to the adhesive pattern 184, but with adhesive dots of varying sizes that are unequally spaced apart.

Referring to FIGS. 11A-11F, a fourth embodiment of a slotted nozzle assembly 100*d* and its constituent components are depicted. Like the slotted nozzle assemblies 100*a*-100*c*, the slotted nozzle assembly 100*d* can comprise a cover plate 402 and a baffle plate 420. The cover plate 402 can be a substantially rectangular shaped plastic or metallic component. The cover plate 402 can define a body 404 that has a front surface 404*a*, a rear surface 404*b* opposite the front surface 404*a* along the lateral direction 4, an upper surface 404*c*, a lower surface 404*d* opposite the upper surface 404*c* along the vertical direction 6, a first side surface 404*e*, and a second side surface 404*f* opposite the first side surface 404*e* along the longitudinal direction 2. The cover plate 402 can also include a lip 408 embodying a substantially rectangular protrusion that extends from the lower surface 404*d* along the vertical direction 6 and along the lower surface 404*d* in the longitudinal direction 2. Additionally, the cover plate 402 can define bores 412*a*, 412*b* that extend from the front surface 404*a* to the rear surface 404*b* along the lateral direction 4. Each of the bores 412*a*, 412*b* is configured to receive a respective fastener 64. Though the cover plate 402 is shown as including two bores 412*a*, 412*b*, the cover plate 402 can include more or less bores as desired. However, the number of bores included in the cover plate 402 will generally correspond to the number of bores defined by the rear recess surface 60*d* of the nozzle body 32*c*.

Similar to the cover plate 402, the baffle plate 420 can be a substantially rectangular shaped plastic or metallic component. The baffle plate 420 can define a body 424 that has a front surface 424*a*, a rear surface 424*b* opposite the front surface 424*a* along the lateral direction 4, an upper surface 424*c*, a lower surface 424*d* opposite the upper surface 424*c* along the vertical direction 6, a first side surface 424*e*, and a second side surface 424*f* opposite the first side surface 424*e* along the longitudinal direction 2. The baffle plate 420 can also include a lip 428 that substantially matches the lip 408 of the cover plate 402. As such, the lip 428 can embody a substantially rectangular protrusion that extends from the lower surface 424*d* along the vertical direction 6 and along the lower surface 424*d* in the longitudinal direction 2. Additionally, the baffle plate 420 can define bores 432*a*, 432*b* that extend from the front surface 424*a* to the rear surface 424*b* along the lateral direction 4. Each of the bores 432*a*, 432*b* is configured to receive a respective fastener 64. Though the baffle plate 420 is shown as including two bores 432*a*, 432*b*, the baffle plate 420 can include more or less bores as desired. However, like the cover plate 402, the number of bores included in the baffle plate 420 will generally correspond to the number of bores defined by the rear recess surface 60*d* of the nozzle body 32*c*.

The baffle plate 420 can also include the features of the slotted nozzle assembly 100*d* that allow the adhesive to flow through the slotted nozzle assembly 100*d*. The baffle plate 420 can define an input recess 436 that extends into the body 424 of the baffle plate 420 from the rear surface 424*b* along the lateral direction 4. The input recess 436 can be substantially rectangular shaped, though other shapes are contemplated. At the top of the input recess 436, the baffle plate 420 can have a slot 440 that extends through the baffle plate 420 from the rear surface 424*b* to the front surface 424*a*. The baffle plate 420 can include a plurality of inner surfaces that define the slot 440. Specifically, the baffle plate 420 can have first and second slot surface 444*a*, 444*b* that define the lower side of the slot 440, as well as a third slot surface 444*c* that is spaced from the first and second slot surface 444*a*, 444*b* along the vertical direction 6 and defines the upper side of the slot 440. The first and third slot surfaces 444*a*, 444*c* can each be substantially planar surfaces, while the second slot surface 444*b* can be a substantially curved, semicircular surface. Though one specific arrangement and design of slot surfaces 444*a*-444*c* are depicted, other embodiments and designs are contemplated. Notably, the slot 440 is depicted as spaced in an entirety from the upper surface 424*c* and the lower surface 424*d*. However, it is contemplated that the slot 440 could extend into the body 424 from the upper surface 424*c*. Opposite the input recess 436, the baffle plate 320 can define a plurality of output recesses 448 that extend into the body 424 of the baffle plate 420 from the front surface 424*a* along the lateral direction 4. As depicted, the baffle plate 420 includes five output recesses 448*a*-448*e* that extend generally parallel to each other and are spaced apart along the longitudinal direction 2. However, the baffle plate 420 can include anywhere from two to ten output recesses 448.

The output recesses 448*a*-448*e* can be substantially rectangular shaped, though other shapes are contemplated, and can extend from the slot 440 to the bottom of the lip 428 of the baffle plate 420. Four of the output recesses can define a width $W_4$ measured along the longitudinal direction 2, where the width $W_4$ can be from about 0.5 mm to about 1 mm, while one of the output recesses 448*e* can define a width $W_5$ measured along the longitudinal direction, where the width $W_5$ can be from about 2 mm to about 6 mm. Though the output recess 448*e* having the greater width $W_5$ is shown as the rightmost recess, the output recesses 448*a*-448*e* can be arranged in any order. Also, as shown in FIG. 12D, the output recesses 448*a*-448*d* can define a first depth $D_1$ measured along the lateral direction 4, while the output recess 448*e* can define a second depth $D_2$ measured along the lateral direction 4 that is greater than the first depth $D_1$. The purpose of these differing depths will be discussed further below.

Figure 11A:
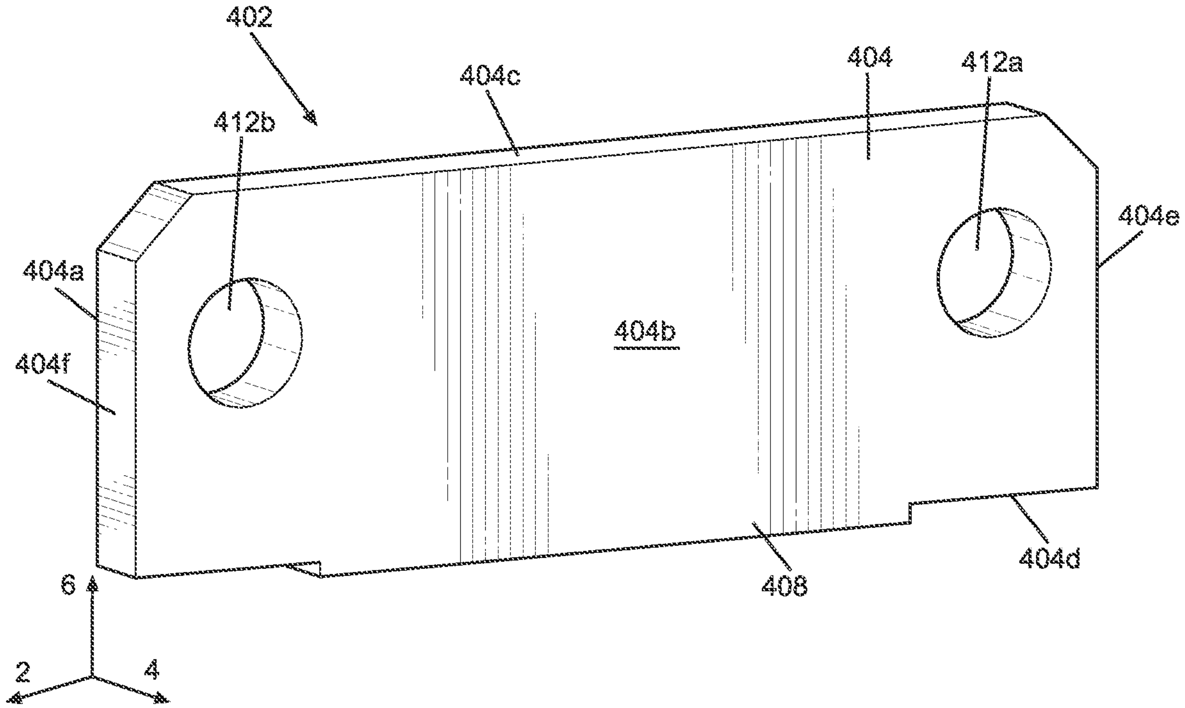
FIG. 11A is a rear perspective view of a cover plate of a slotted nozzle assembly according to a fourth embodiment of the present disclosure.
Figure 11B:
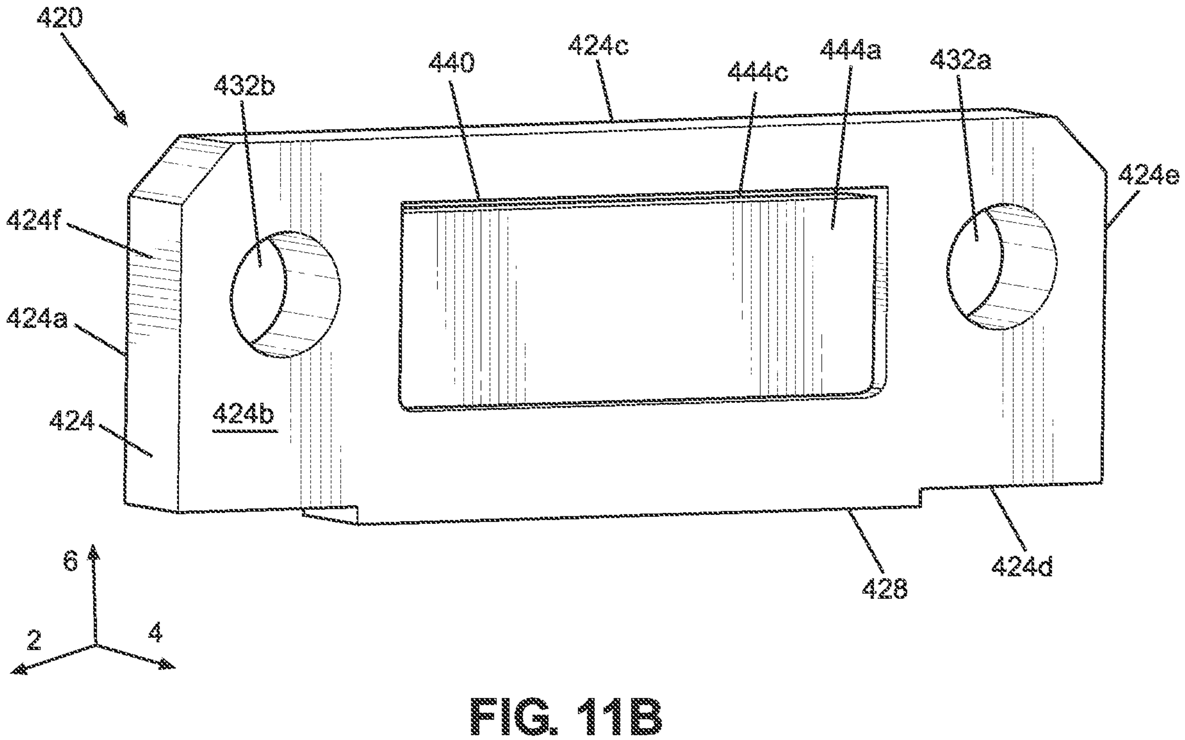
FIG. 11B is a rear perspective view of a baffle plate of the fourth embodiment of the slotted nozzle assembly.
Figure 11C:
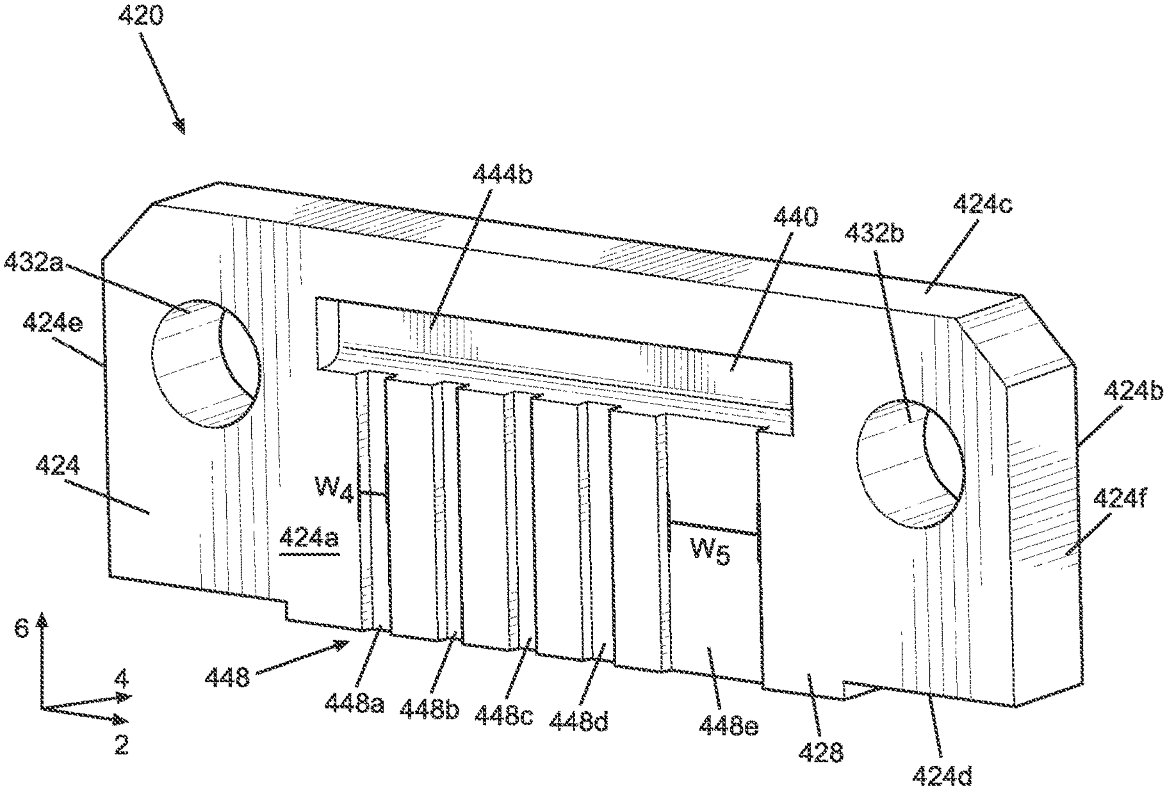
FIG. 11C is a front perspective view of the baffle plate of the fourth embodiment of the slotted nozzle assembly.
Figure 11D:
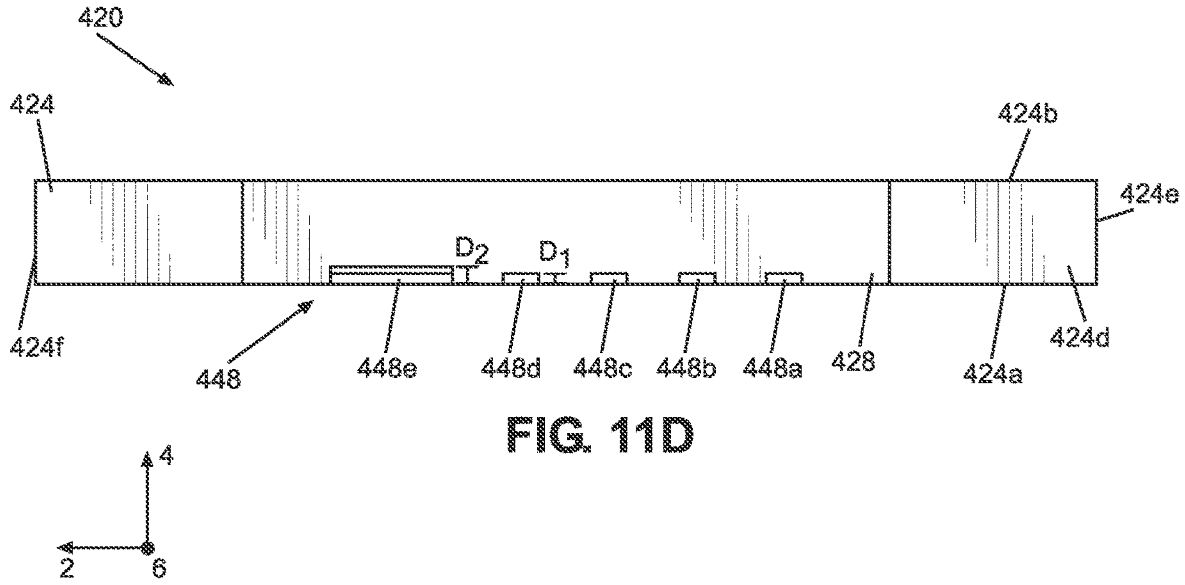
FIG. 11D is a bottom view of the baffle plate of the fourth embodiment of the slotted nozzle assembly.
Figure 11E:
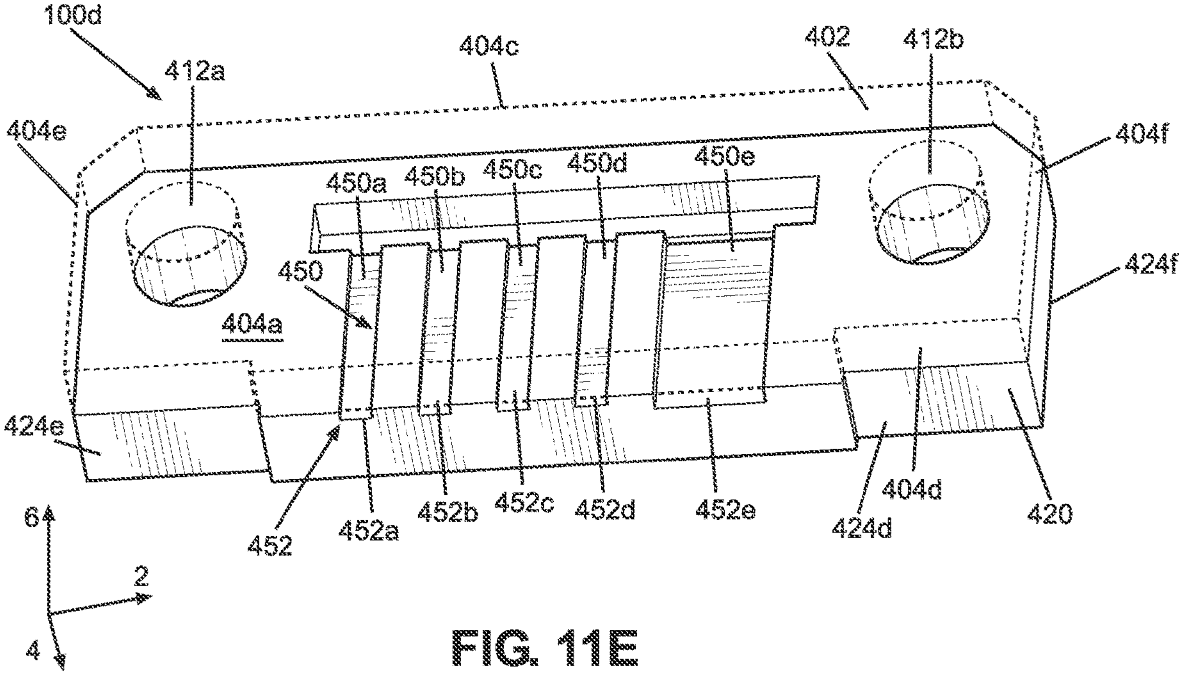
FIG. 11E is a bottom perspective view of the fourth embodiment of the slotted nozzle assembly.
Figure 11F:
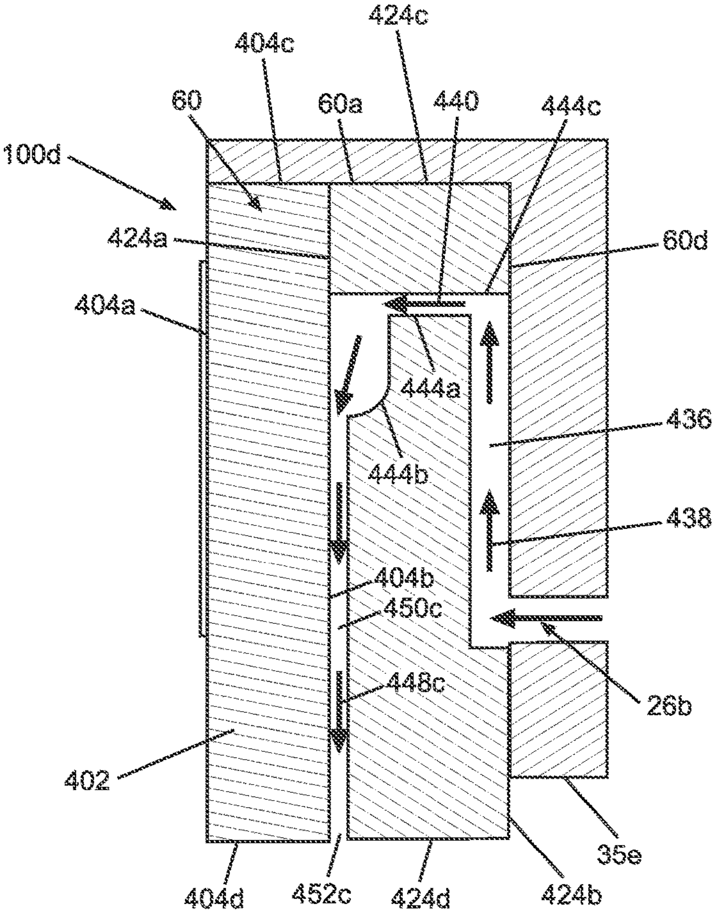
FIG. 11F is a cross-sectional view of the fourth embodiment of the slotted nozzle assembly attached to the nozzle body.

With specific reference to FIG. 11F, the slotted nozzle assembly 100*d* is shown fully assembled and connected to the pump 16. Specifically, the slotted nozzle assembly 100*d* is shaped and sized to be received in the recess 60 of the pump body assembly 32. To attach the slotted nozzle assembly 100*d* to the pump 16, the bores 412*a*, 412*b* of the cover plate 402 are aligned with the bores 432*a*, 432*b* of the baffle plate 420 and the bores 62*a*, 62*b* of the nozzle body 32*c*. Then, a fastener 64 is disposed through bores 412*a*, 432*a*, 62*a* while another fastener 64 is disposed through bores 412*b*, 432*b*, 62*b*, and the fasteners 64 are coupled to the nozzle body 32*c* to releasably couple the slotted nozzle assembly 100*d* to the pump 16. When attached to the pump 16, the upper surface 404*c* of the cover plate 402 and the upper surface 424*c* of the baffle plate 420 can engage the upper recess surface 60*a*, while the rear surface 424*b* of the baffle plate 420 can engage the rear recess surface 60*d*. Additionally, the first side surface 404*e* of the cover plate 402 and the first side surface 424*e* of the baffle plate 420 can engage the first side recess surface 60*b*, while the second side surface 404*f* of the cover plate 402 and the second side surface 424*f* of the baffle plate 420 can engage the second side recess surface 60*c*. The front surface 404*a* of the cover plate 402 can be substantially coplanar with the front surface 35*a* of the nozzle body 32*c*, while the lower surfaces 404*d*, 424*d* of the cover plate 402 and baffle plate 420, respectively, can be positioned below the lower surface 35*e* of the nozzle body 32*c* along the vertical 6.

Figure 11G:
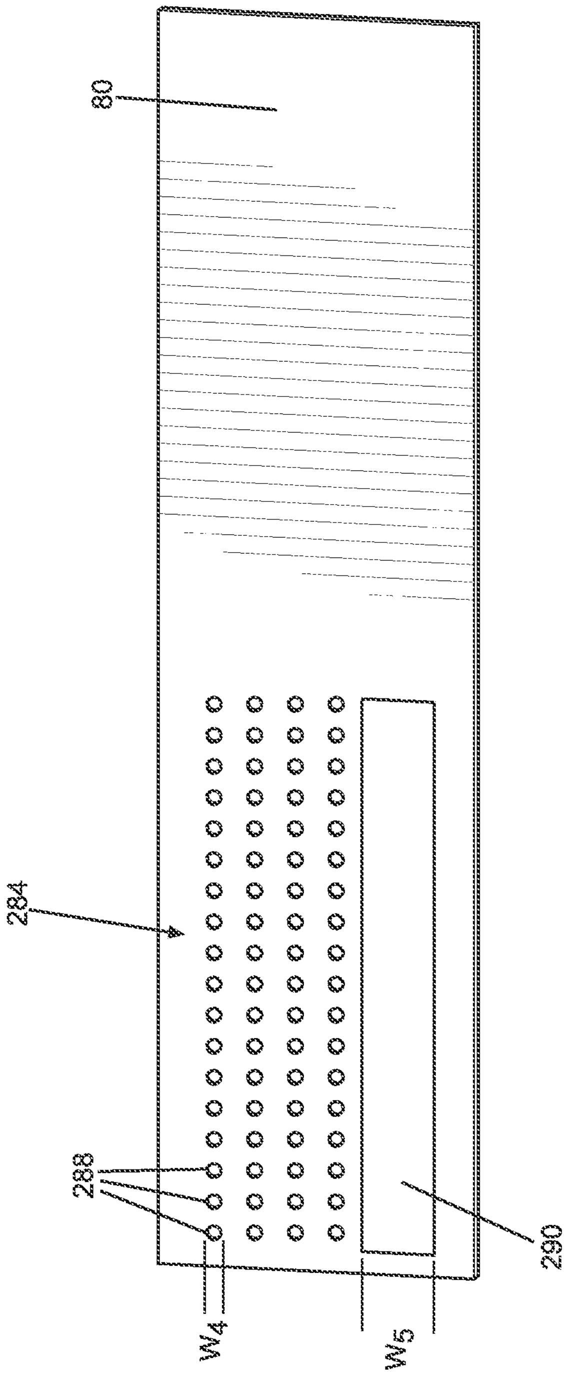
FIG. 11G is a perspective view of a substrate with an adhesive pattern applied using the fourth embodiment of the slotted nozzle assembly.

FIG. 11F also shows the flow path of adhesive as it flows through the pump 16 and slotted nozzle assembly 100*d*, where the direction of fluid flow is indicated by solid arrows. When the cover plate 402 and baffle plate 420 are secured to the nozzle body 32*c*, an input channel 438 that receives adhesive from the outlet 26*b* of the fluid channel 26 is defined between the baffle plate 420 and the nozzle body 32*c*. Specifically, the input channel 438 is defined by the input recess 436 of the baffle plate 420 and the rear recess surface 60*d* of the nozzle body 32*c*. The input channel 438 extends from the outlet 26*b* of the fluid channel 26 to the slot 440, which, as noted above, extends through the entirety of the baffle plate 420. The slotted nozzle assembly 100*d* also defines a plurality of output channels 450*a*-450*e* between the baffle plate 320 and the cover plate 302. Specifically, the output channels 450*a*-450*e* are each defined by a respective one of the output recesses 448*a*-448*e* of the baffle plate 420 and the rear surface 404*b* of the cover plate 402. The output channels 450*a*-450*e* each extend from the slot 440 and terminate at a respective dispensing outlet 452*a*-452*g*, from which adhesive is applied to the substrate 80. Because the baffle plate 420 can have between two and ten output recesses 448, the nozzle assembly 100*d* can similarly have between two and ten output channels 450 and between two and ten dispensing outlets 452. As shown in FIG. 11E, the dispensing outlets 452*a*-452*e* of the slotted nozzle assembly 100*d* take the form of longitudinally spaced apart slots so as to produce an adhesive pattern 284 that comprises an array of adhesive dots 288 and a continuous adhesive strip 290. Thus, when the valve member 48 of the pump 16 is in a retracted position, adhesive can flow past the valve seat 54, through the outlet 26*b* of the fluid channel 26, and into the input channel 438. From there, the adhesive flows vertically up through the input channel 438, laterally through the slot 440, downwardly through the output channels 450*a*-450*e*, and through the dispensing outlets 452*a*-452*e* and onto the substrate 80. However, due to the increased depth $D_2$ of the output recess 448*e* relative to the depth $D_1$ of the output recesses 448*a*-448*d*, when the valve member 48 is in the extended position and adhesive is blocked from flowing past the valve seat 54, no adhesive will flow through output channels 450*a*-450*d*, while adhesive will continue to flow through output channel 450*e*, producing the adhesive pattern shown in FIG. 11G.

Figure 13A:
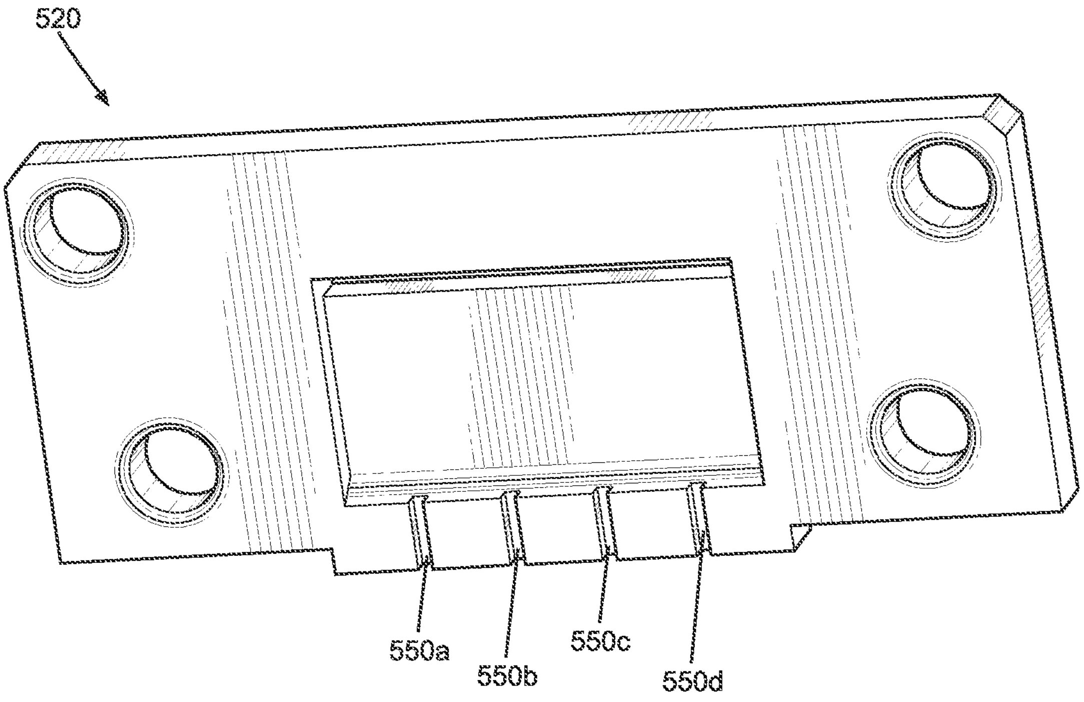
FIG. 13A is an isometric perspective view of a baffle plate according to another embodiment of the slotted nozzle assembly.
Figure 13B:
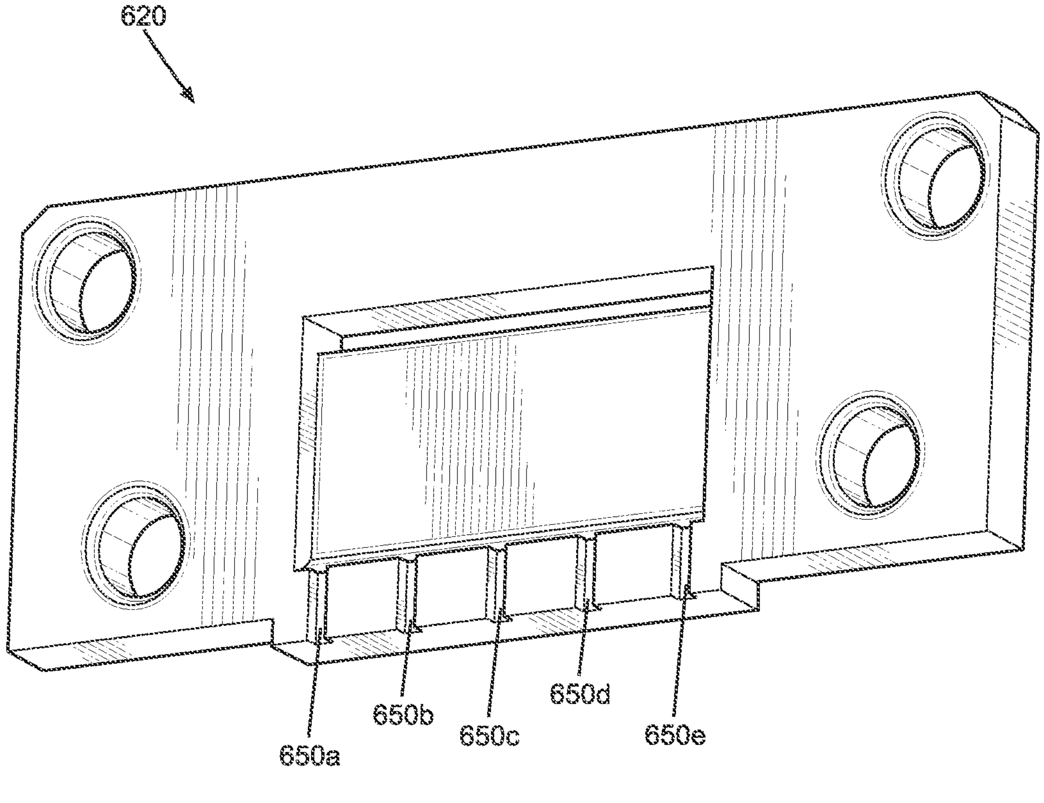
FIG. 13B is an isometric perspective view of a baffle plate according to yet another embodiment of the slotted nozzle assembly.
Figure 13C:
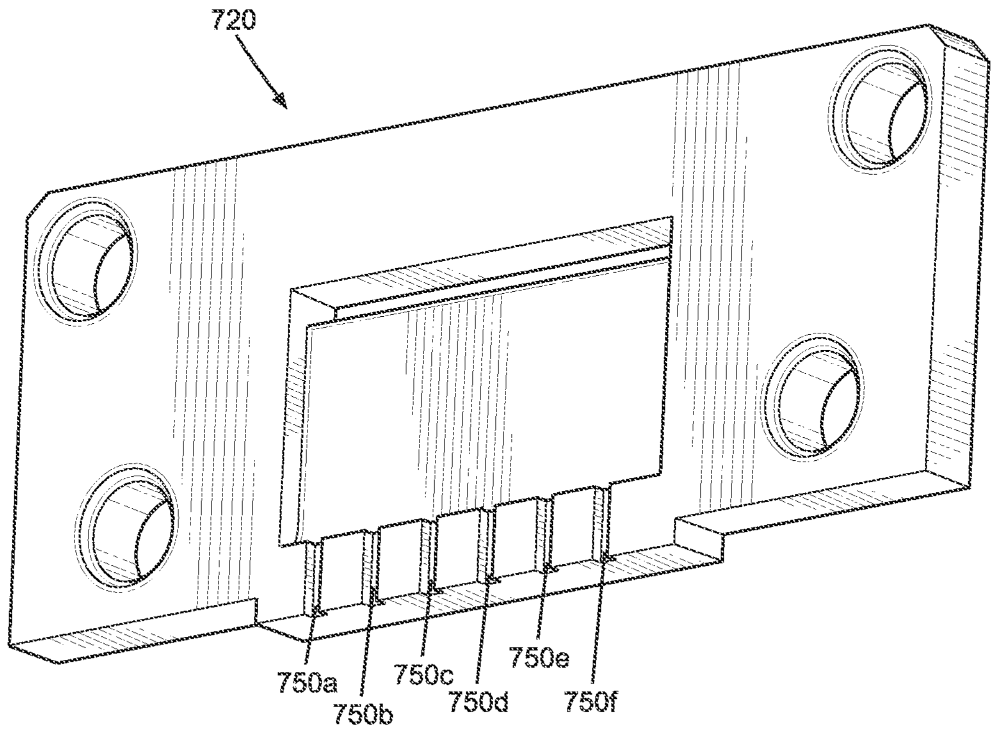
FIG. 13C is an isometric perspective view of a baffle plate according to yet another embodiment of the slotted nozzle assembly.
Figure 13D:
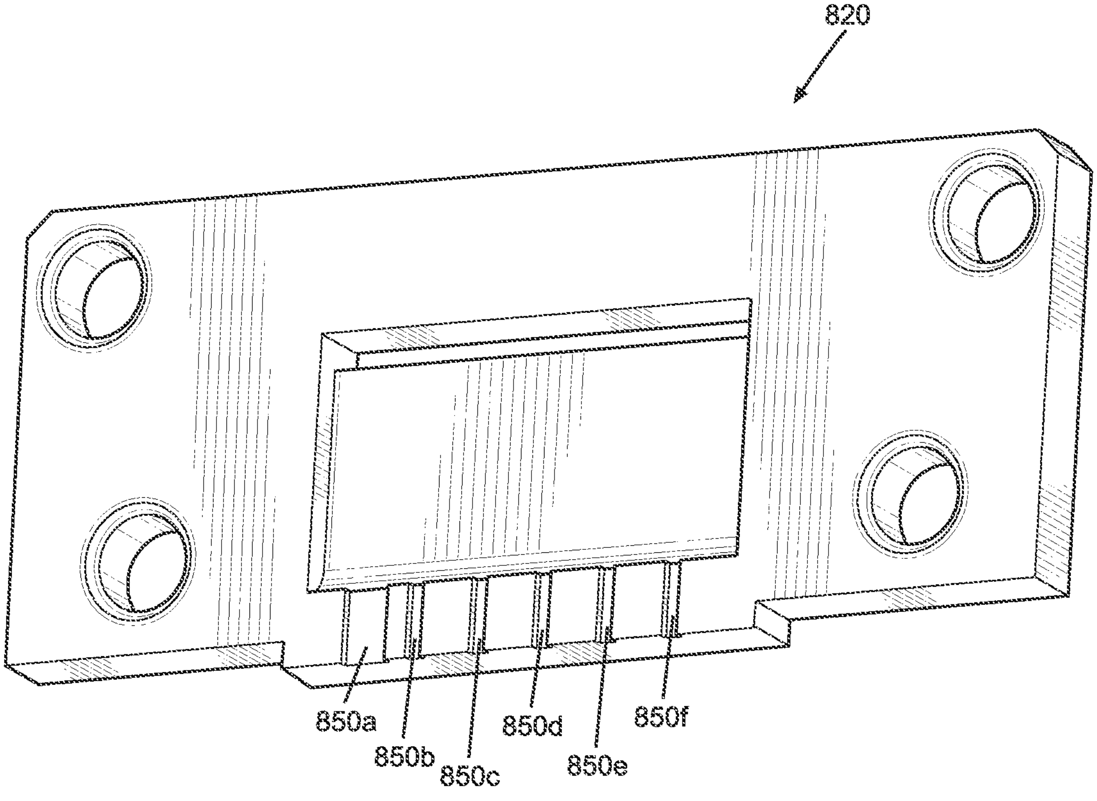
FIG. 13D is an isometric perspective view of a baffle plate according to yet another embodiment of the slotted nozzle assembly.

FIGS. 13A-13D depict alternative aspects of slotted nozzle assemblies. Referring to FIG. 13A, an aspect of a baffle plate 520 is shown having four output channels 550*a*-550*d*. FIG. 13B depicts another aspect of a baffle plate 620 showing five output channels 650*a*-650*e*. FIG. 13C depicts another aspect of a baffle plate 720 showing six output channels 750*a*-750*f*. FIG. 13C depicts yet another aspect of a baffle plate 820 showing six output channels 850*a*-850*f*.

The design of the disclosed adhesive dispenser 10, and particularly the slotted nozzle assemblies 100*a*-100*d*, provides for many benefits when performing an adhesive dispensing operation. Conventional adhesive dispensers frequently spill excessive material during a dispensing process due to gravity, which can lead to big ends, silk drawing, and other dispensing defects on the surface of the substrate during a dispensing process, as well as at the end of a dispensing process due to the continued undesired flow of adhesive. In contrast, the slotted nozzle assemblies 100*a*-100*d* can prevent such a consequence. The placement of the outlet 26*b* of the fluid channel 26 of the pump 16 between the slot 140, 240, 340, 440 of the baffle plate 120, 220, 320, 420 and the dispensing outlets 152, 252, 352, 452 of the slotted nozzle assemblies 100*a*-100*d* along the vertical direction helps prevent material from continuing to flow to the dispensing outlets 152, 252, 352, 452 when the valve member 48 engages the valve seat 54 and blocks the flow of adhesive through the fluid channel 26. This is because the adhesive must first flow upwards in a first flow direction through the respective input channel 138, 238, 338, 438 of each of the slotted nozzle assemblies 100*a*-100*d* before flowing through the slot 140, 240, 340, 440 and then downwards in a second flow direction that is opposite the first flow direction and out of the respective dispensing outlets 152, 252, 352, 452. When the valve member 48 engages the valve seat 54, the upward position of the slot 140, 240, 340, 440 in comparison to the outlet 26*b* of the fluid channel 26 will prevent overflow of adhesive through the slot 140, 240, 340, 440, and likewise prevent adhesive flow out of the slotted nozzle assemblies 100*a*-100*d*. Further, the disclosed adhesive dispenser 10 embodies a low weight, low profile dispenser. The ability to receive a slotted nozzle assembly 100*a*-100*d* within the recess 60 of the pump 16 causes the inclusion of the slotted nozzle assembly 100*a*-100*d* to not significantly increase the overall profile of the adhesive dispenser 10, while still providing the ability to change between any of the slotted nozzle assemblies 100*a*-100*d*.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts, and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features, and concepts may be expressly identified herein as being inventive or forming part of an invention, such identification is not intended to be exclusive, but rather there may be inventive aspects, concepts, and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed:

1. An adhesive dispenser, comprising:

a pump comprising:

a pump body assembly including a nozzle body defining a recess that extends into the nozzle body and defines a valve seat, and a fluid channel that has an inlet configured to receive adhesive and an outlet, wherein the outlet is open to the recess; and a valve member movably disposed in the fluid channel and configured to contact the valve seat to selectively block the adhesive from flowing to the outlet of the fluid channel; and a slotted nozzle assembly for dispensing the adhesive, the slotted nozzle assembly comprising:

a baffle plate including a slot that extends through the baffle plate; and a cover plate attached to the baffle plate, wherein the recess extends into the nozzle body that includes the valve seat and the slotted nozzle assembly is received in the recess of the nozzle body such that an input channel that extends from the recess of the nozzle body to the slot is defined between the baffle plate and the nozzle body, and an output channel that extends from the slot to a dispensing outlet is defined between the baffle plate and the cover plate.

2. The adhesive dispenser of claim 1, wherein the adhesive flows in a first flow direction through the input channel and in a second flow direction that is opposite the first flow direction through the output channel.

3. The adhesive dispenser of claim 1, wherein the baffle plate has an upper surface, a lower surface opposite the upper surface along a vertical direction, a front surface, and a rear surface opposite the front surface along a lateral direction that is perpendicular to the vertical direction, wherein the slot 1) extends from the front surface to the rear surface and 2) is spaced in an entirety from the upper surface and the lower surface.

4. The adhesive dispenser of claim 3, wherein the outlet of the fluid channel is positioned along the vertical direction between the slot of the baffle plate and the dispensing outlet.

5. The adhesive dispenser of claim 4, wherein the nozzle body includes a front surface, a bottom surface, an upper recess surface that extends from the front surface, and a rear recess surface that extends from the bottom surface to the upper recess surface, wherein the upper and rear recess surfaces at least partially define the recess.

6. The adhesive dispenser of claim 3, wherein the baffle plate defines an input recess that extends into the baffle plate from the rear surface, such that the input recess at least partially defines the input channel.

7. The adhesive dispenser of claim 6, wherein the output channel includes a plurality of output channels, and the baffle plate further defines a plurality of output recesses that extend into the baffle plate from the front surface and are spaced apart along a longitudinal direction that is perpendicular to the lateral and vertical directions, such that each of the plurality of output recesses at least partially defines a corresponding one of the plurality of output channels.

8. The adhesive dispenser of claim 7, wherein the cover plate has a rear surface that at least partially defines the output channels and a front surface opposite the rear surface along the longitudinal direction, wherein the front surface of the cover plate is substantially coplanar with the front surface of the nozzle body.

9. The adhesive dispenser of claim 7, wherein each of the plurality of output recesses has a substantially matching width.

10. The adhesive dispenser of claim 6, wherein the baffle plate further defines a single output recess that extends into the baffle plate from the front surface, such that the single output recess at least partially defines the output channel.

11. The adhesive dispenser of claim 10, wherein the single output recess defines a width along a longitudinal direction that is perpendicular to the lateral and vertical directions and is from about 4 mm to about 20 mm.

12. The adhesive dispenser of claim 10, wherein the dispensing outlet is configured to produce an adhesive pattern that comprises a continuous adhesive strip.

13. The adhesive dispenser of claim 7, wherein the plurality of output recesses are non-equidistantly spaced apart along the lateral direction.

14. The adhesive dispenser of claim 7, wherein the dispensing outlet includes a plurality of dispensing outlets, and wherein each of the plurality of output channels extends from the slot to a respective one of the plurality of dispensing outlets.

15. The adhesive dispenser of claim 14, wherein the plurality of dispensing outlets includes between two dispensing outlets and ten dispensing outlets.

16. The adhesive dispenser of claim 14, wherein the plurality of dispensing outlets are configured to produce an adhesive pattern that comprises a rectangular array of adhesive dots.

17. The adhesive dispenser of claim 16, wherein each of the output recesses has a width measured along the longitudinal direction that is from about 0.5 mm to about 1.0 mm.

18. The adhesive dispenser of claim 7, wherein a first output recess of the plurality of output recesses defines a width measured along the longitudinal direction that is from about 0.5 mm to about 1.0 mm, and a second output recess of the plurality of output recesses defines a width measured along the longitudinal direction that is from about 2 mm to about 6 mm.

19. The adhesive dispenser of claim 18, wherein the second output recess defines a depth along the lateral direction that is greater than a depth of the first output recess.

20. The adhesive dispenser of claim 14, wherein the plurality of dispensing outlets are configured to produce an adhesive pattern that comprises a rectangular array of adhesive dots and a continuous adhesive strip.

21. The adhesive dispenser of claim 1, wherein the slotted nozzle assembly further comprises at least one fastener configured to extend through the baffle plate and the cover plate and releasably engage the nozzle body so as to secure the slotted nozzle assembly to the nozzle body.

22. The adhesive dispenser of claim 1, further comprising:

a material supply comprising a cavity for receiving a supply of adhesive and a channel that extends from the cavity to a fluid outlet that is in communication with the inlet of the fluid channel.

23. The adhesive dispenser of claim 22, wherein the material supply includes a check valve fluidly disposed between the cavity and the fluid outlet, such that the adhesive is prevented from flowing back into the cavity after it flows through the check valve.

24. The adhesive dispenser of claim 22, wherein the supply of adhesive is a prepackaged syringe containing the adhesive.

25. The adhesive dispenser of claim 1, wherein the nozzle body defines a valve seat, and the valve member is movable within the fluid channel between 1) a first position, where the valve member is spaced in an entirety from the valve seat and adhesive can flow to the outlet of the fluid channel, and 2) a second position, where the valve member contacts the valve seat and the adhesive is blocked from flowing to the outlet of the fluid channel.

26. The adhesive dispenser of claim 1, further comprising:

a pressurized air source for selectively moving the valve member; and a solenoid valve for controlling air flow from the pressurized air source.

* * * * *